US007020089B2

(12) United States Patent
Matsuda

(10) Patent No.: US 7,020,089 B2
(45) Date of Patent: Mar. 28, 2006

(54) INFORMATION PROCESSING APPARATUS AND METHOD OF CONTROLLING THE INFORMATION PROCESSING APPARATUS

(75) Inventor: Yasuhiro Matsuda, Odawara (JP)

(73) Assignee: Hitachi, Ltd., Tokyo (JP)

( * ) Notice: Subject to any disclaimer, the term of this patent is extended or adjusted under 35 U.S.C. 154(b) by 86 days.

(21) Appl. No.: 10/837,565

(22) Filed: May 4, 2004

(65) Prior Publication Data

US 2005/0195736 A1 Sep. 8, 2005

(30) Foreign Application Priority Data

Mar. 8, 2004 (JP) ............................. 2004-063959

(51) Int. Cl.
*G01R 31/08* (2006.01)

(52) U.S. Cl. ...................... 370/242; 370/248; 709/217

(58) Field of Classification Search ..................... None
See application file for complete search history.

(56) References Cited

U.S. PATENT DOCUMENTS

| 6,260,120 | B1 | 7/2001 | Blumenau et al. | |
|---|---|---|---|---|
| 6,542,961 | B1 | 4/2003 | Matsunami et al. | |
| 6,601,187 | B1 | 7/2003 | Sicola et al. | |
| 6,775,230 | B1 * | 8/2004 | Watanabe et al. | ........... 370/228 |
| 6,922,414 | B1 * | 7/2005 | Gunlock | ..................... 370/412 |
| 2003/0188035 | A1 | 10/2003 | Lubbers et al. | |
| 2003/0191904 | A1 | 10/2003 | Iwami et al. | |
| 2003/0204597 | A1 * | 10/2003 | Arakawa et al. | ............ 709/226 |
| 2004/0049572 | A1 * | 3/2004 | Yamamoto et al. | ......... 709/224 |
| 2004/0054866 | A1 * | 3/2004 | Blumenau et al. | .......... 711/202 |
| 2005/0025045 | A1 * | 2/2005 | Shimozono et al. | ........ 370/225 |
| 2005/0119996 | A1 * | 6/2005 | Ohata et al. | .................... 707/3 |

FOREIGN PATENT DOCUMENTS

JP 2003-167794 11/2001

* cited by examiner

*Primary Examiner*—Duc Ho
(74) *Attorney, Agent, or Firm*—Reed Smith LLP; Stanley P. Fisher, Esq.; Juan Carlos A. Marquez, Esq.

(57) ABSTRACT

An information processing system comprises an information processing apparatus, a switch, and a storage device, wherein the first communication ports and the third communication ports are connected to the second communication ports. When a response from a storage device to a data input/output request is not received within a predetermined time period, the information processing apparatus transmits a second and a third data input/output requests from the first communication port on the first communication channel, and transmits an inspection request to the switch to inspect a second communication port on the first communication channel. When responses to the second and third data input/output requests are not received within a predetermined time period, and a response to the inspection request is received within a predetermined time period, the information processing apparatus determines that there is a fault in the first communication port on the first communication channel.

17 Claims, 30 Drawing Sheets

FIG. 8

STORAGE DEVICE CONFIGURATION
INFORMATION MANAGEMENT TABLE  122

| LOCATION OF PORT | PORT INFORMATION | | | |
|---|---|---|---|---|
| RAID WWPN | R121 | R122 | R123 | R124 |
| Switch WWPN | SW115 | SW116 | SW117 | SW118 |
| LUN | 0~225 | 0~225 | 0~225 | 0~225 |

| PORT INFORMATION | SW111 | SW112 | SW113 | SW114 | SW115 | SW116 | SW117 | SW118 |
|---|---|---|---|---|---|---|---|---|

FIG. 10

| CONFIGURATION NUMBER | OBJECT LUN | CONFIGURATION INFORMATION | | | STATUS MANAGEMENT |
|---|---|---|---|---|---|
| 1 | LUN125 | HBA105 | SW111 | SW115 | R121 | UNWORKABLE |
| 2 | | | SW111 | SW116 | R122 | WORKABLE |
| 3 | | | SW111 | SW117 | R123 | WORKABLE |
| 4 | | | SW111 | SW118 | R124 | WORKABLE |
| 5 | | HBA106 | SW112 | SW115 | R121 | WORKABLE |
| 6 | | | SW112 | SW116 | R122 | WORKABLE |
| 7 | | | SW112 | SW117 | R123 | WORKABLE |
| 8 | | | SW112 | SW118 | R124 | WORKABLE |
| 9 | | HBA107 | SW113 | SW115 | R121 | WORKABLE |
| 10 | | | SW113 | SW116 | R122 | WORKABLE |
| 11 | | | SW113 | SW117 | R123 | WORKABLE |
| 12 | | | SW113 | SW118 | R124 | WORKABLE |
| 13 | | HBA108 | SW114 | SW115 | R121 | WORKABLE |
| 14 | | | SW114 | SW116 | R122 | WORKABLE |
| 15 | | | SW114 | SW117 | R123 | WORKABLE |
| 16 | | | SW114 | SW118 | R124 | WORKABLE |
| 17 | LUN126 | HBA105 | SW115 | SW115 | R121 | WORKABLE |
| 18 | | | SW115 | SW116 | R122 | WORKABLE |
| 19 | | | SW115 | SW117 | R123 | WORKABLE |
| 20 | | | SW115 | SW118 | R124 | WORKABLE |
| 21 | | HBA106 | SW116 | SW115 | R121 | WORKABLE |
| 22 | | | SW116 | SW116 | R122 | WORKABLE |
| 23 | | | SW116 | SW117 | R123 | WORKABLE |
| 24 | | | SW116 | SW118 | R124 | WORKABLE |
| 25 | | HBA107 | SW117 | SW115 | R121 | WORKABLE |
| 26 | | | SW117 | SW116 | R122 | WORKABLE |
| 27 | | | SW117 | SW117 | R123 | WORKABLE |
| 28 | | | SW117 | SW118 | R124 | WORKABLE |
| 29 | | HBA108 | SW118 | SW115 | R121 | WORKABLE |
| 30 | | | SW118 | SW116 | R122 | WORKABLE |
| 31 | | | SW118 | SW117 | R123 | WORKABLE |
| 32 | | | SW118 | SW118 | R124 | WORKABLE |

224

FIG. 11
FAULT ROUTE MAP CHECK MAP ⟋225

| ROUTE CHECK NUMBER | DETERMINATION CHANNEL | | | |
|---|---|---|---|---|
| TUR-1 | HBA105 | SW111 | SW115 | R121 | LUN125 |
| TUR-2 | HBA106 | SW112 | SW115 | R121 | LUN125 |
| TUR-3 | HBA105 | SW111 | SW116 | R122 | LUN125 |
| TUR-4 | HBA105 | SW111 | SW115 | R121 | LUN126 |
| TEST-1 | HBA106 | SW112 | SW111 | SW115 | HBA106 |
| TEST-2 | HBA105 | SW112 | SW115 | SW112 | HBA106 |

FIG. 12
FAULT ROUTE CHECK RESULT

| ROUTE CHECK NUMBER | DETERMINATION CHANNEL | | | | | TEST RESULT |
|---|---|---|---|---|---|---|
| TUR-1 | HBA105 | SW111 | SW115 | R121 | LUN125 | ABNORMAL |
| TUR-2 | HBA106 | SW112 | SW115 | R121 | LUN125 | ABNORMAL |
| TUR-3 | HBA105 | SW111 | SW116 | R122 | LUN125 | ABNORMAL |
| TUR-4 | HBA105 | SW111 | SW115 | R121 | LUN126 | NORMAL |
| TEST-1 | HBA106 | SW112 | SW111 | SW115 | HBA106 | NORMAL |
| TEST-2 | HBA105 | SW112 | SW115 | SW112 | HBA106 | NORMAL |

FIG. 13

FAULT ROUTE CHECK RESULT

| ROUTE CHECK NUMBER | DETERMINATION CHANNEL | | | | TEST RESULT |
|---|---|---|---|---|---|
| TUR-1 | HBA105 | SW111 | SW115 | R121 | LUN125 | ABNORMAL |
| TUR-2 | HBA106 | SW112 | SW115 | R121 | LUN125 | ABNORMAL |
| TUR-3 | HBA105 | SW111 | SW116 | R122 | LUN125 | NORMAL |
| TUR-4 | HBA105 | SW111 | SW115 | R121 | LUN126 | ABNORMAL |
| TEST-1 | HBA106 | SW112 | SW111 | SW115 | HBA106 | NORMAL |
| TEST-2 | HBA105 | SW112 | SW115 | SW112 | HBA106 | NORMAL |

FIG. 14

FAULT ROUTE CHECK RESULT

| ROUTE CHECK NUMBER | DETERMINATION CHANNEL | | | | TEST RESULT |
|---|---|---|---|---|---|
| TUR-1 | HBA105 | SW111 | SW115 | R121 | LUN125 | ABNORMAL |
| TUR-2 | HBA106 | SW112 | SW115 | R121 | LUN125 | ABNORMAL |
| TUR-3 | HBA105 | SW111 | SW116 | R122 | LUN125 | NORMAL |
| TUR-4 | HBA105 | SW111 | SW115 | R121 | LUN126 | ABNORMAL |
| TEST-1 | HBA106 | SW112 | SW111 | SW115 | HBA106 | NORMAL |
| TEST-2 | HBA105 | SW112 | SW115 | SW112 | HBA106 | ABNORMAL |

FIG. 15

FAULT ROUTE CHECK RESULT

| ROUTE CHECK NUMBER | DETERMINATION CHANNEL | | | | TEST RESULT |
|---|---|---|---|---|---|
| TUR-1 | HBA105 | SW111 | SW115 | R121 | LUN125 | ABNORMAL |
| TUR-2 | HBA106 | SW112 | SW115 | R121 | LUN125 | NORMAL |
| TUR-3 | HBA105 | SW111 | SW116 | R122 | LUN125 | ABNORMAL |
| TUR-4 | HBA105 | SW111 | SW115 | R121 | LUN126 | ABNORMAL |
| TEST-1 | HBA106 | SW112 | SW111 | SW112 | HBA106 | ABNORMAL |
| TEST-2 | HBA105 | SW112 | SW115 | SW112 | HBA106 | NORMAL |

FIG. 16

FAULT ROUTE CHECK RESULT

| ROUTE CHECK NUMBER | DETERMINATION CHANNEL | | | | TEST RESULT |
|---|---|---|---|---|---|
| TUR-1 | HBA105 | SW111 | SW115 | R121 | LUN125 | ABNORMAL |
| TUR-2 | HBA106 | SW112 | SW115 | R121 | LUN125 | NORMAL |
| TUR-3 | HBA105 | SW111 | SW116 | R122 | LUN125 | ABNORMAL |
| TUR-4 | HBA105 | SW111 | SW115 | R121 | LUN126 | ABNORMAL |
| TEST-1 | HBA106 | SW112 | SW111 | SW112 | HBA106 | NORMAL |
| TEST-2 | HBA105 | SW112 | SW115 | SW112 | HBA106 | NORMAL |

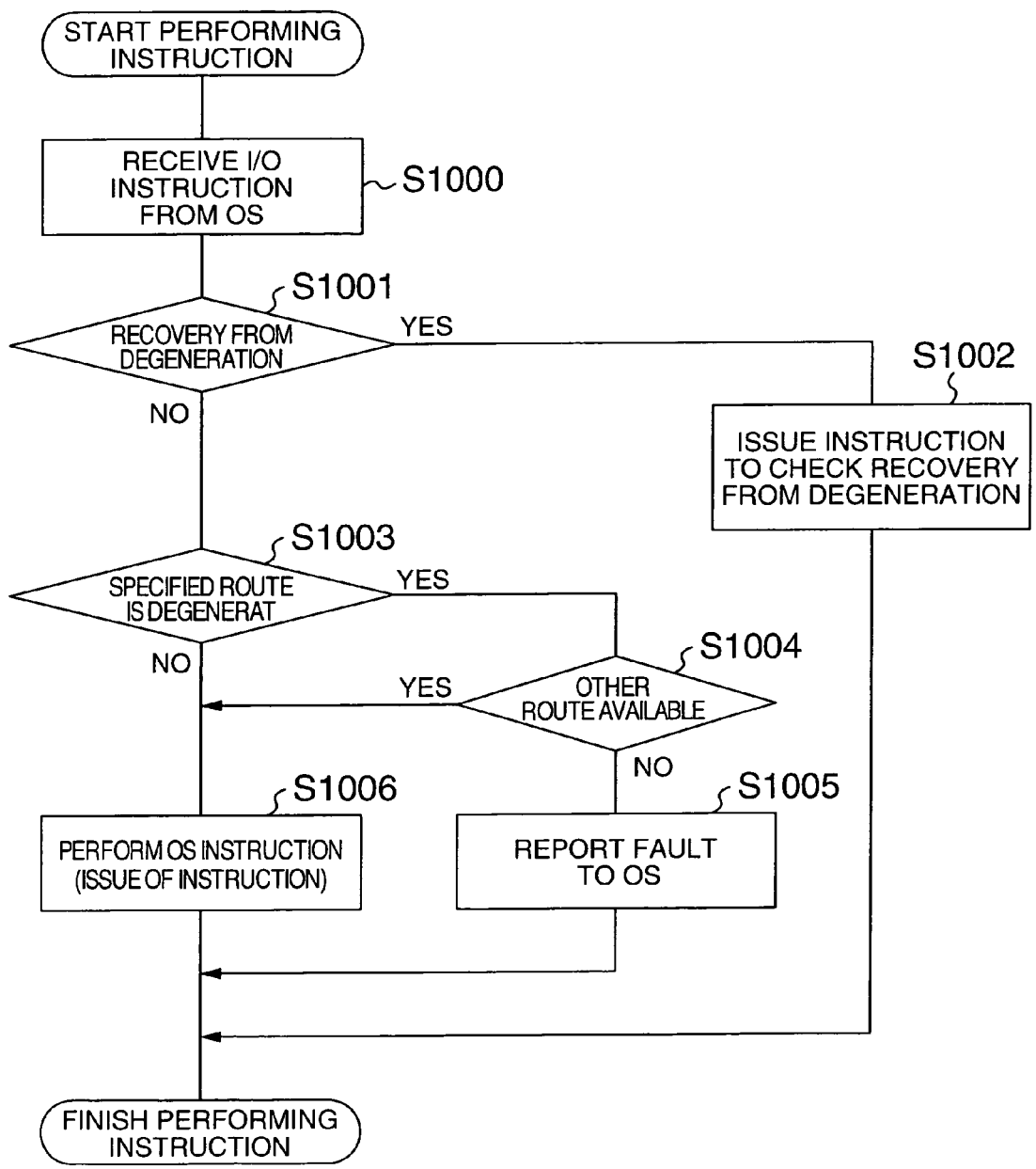

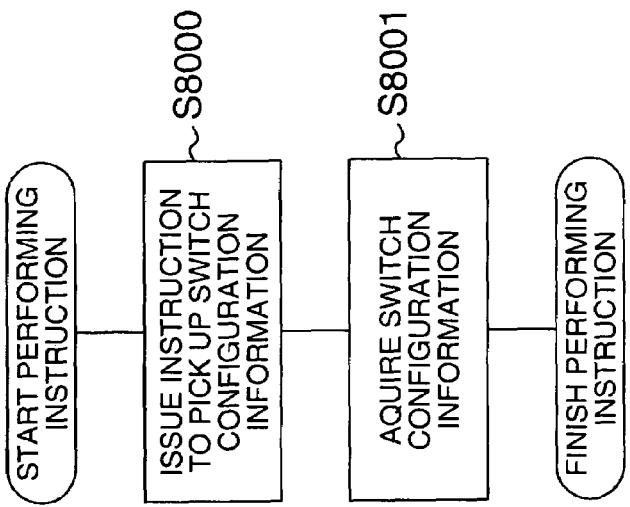
FIG. 29
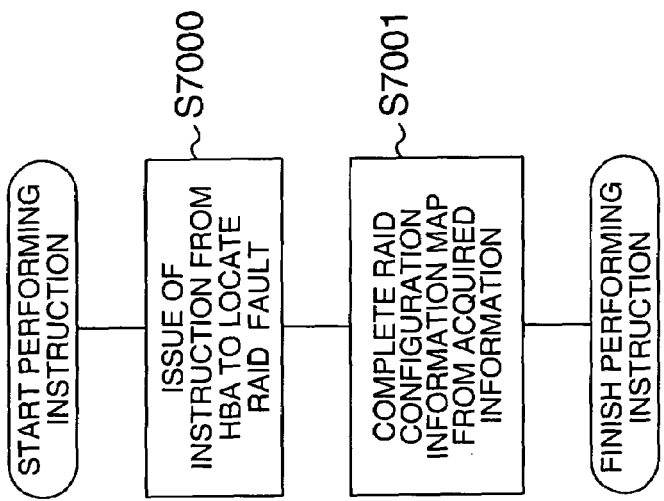
FIG. 26
FIG. 25

| PICK PORT CHECK RESULT | PORT ROUTE INFORMATION | | | | CHECK RESULT |
|---|---|---|---|---|---|
| CHECK ROUTE 1 | R121 | SW115 | SW116 | R122 | NG |
| CHECK ROUTE 2 | R121 | SW115 | SW117 | R123 | NG |
| CHECK ROUTE 3 | R121 | SW115 | SW118 | R124 | NG |
| CHECK ROUTE 4 | R122 | SW116 | SW115 | R121 | NG |
| CHECK ROUTE 5 | R122 | SW116 | SW117 | R123 | OK |
| CHECK ROUTE 6 | R122 | SW116 | SW118 | R124 | OK |
| CHECK ROUTE 7 | R123 | SW117 | SW115 | R121 | NG |
| CHECK ROUTE 8 | R123 | SW117 | SW116 | R122 | OK |
| CHECK ROUTE 9 | R123 | SW117 | SW118 | R124 | OK |
| CHECK ROUTE 10 | R124 | SW118 | SW115 | R121 | NG |
| CHECK ROUTE 11 | R124 | SW118 | SW116 | R122 | OK |
| CHECK ROUTE 12 | R124 | SW118 | SW117 | R123 | OK |

| PORT LOCATION | PORT INFORMATION | | | |
|---|---|---|---|---|
| RAID WWPN | R121 | R122 | R123 | R124 |
| Switch WWPN | SW115 | SW116 | SW117 | SW118 |
| LUN | 0~225 | 0~225 | 0~225 | 0~225 |
| RESULT OF LOCATING FAULT IN RAID | NG | OK | OK | OK |

FIG. 33

| HBA | RAID WWPN | RAID WWPN | LUN | SWITCH INFORMATION (WITHOUT CASCADE) 226 | |
|---|---|---|---|---|---|
| | | | | SW WWPN | SW-SW |
| HBA105 | RAID 120 | R121 | 0-255 | SW215 | SECOND SW INFORMATION IS NOT PRESENT IN CASE WHERE CASCADE IS NOT PRESENT |
| | | R122 | | SW216 | |
| | | R123 | | SW217 | |
| | | R124 | | SW218 | |
| HBA106 | RAID 120 | R121 | 0-255 | SW215 | |
| | | R122 | | SW216 | |
| | | R123 | | SW217 | |
| | | R124 | | SW218 | |
| HBA107 | RAID 120 | R121 | 0-255 | SW215 | |
| | | R122 | | SW216 | |
| | | R123 | | SW217 | |
| | | R124 | | SW218 | |
| HBA108 | RAID 120 | R121 | 0-255 | SW215 | |
| | | R122 | | SW216 | |
| | | R123 | | SW217 | |
| | | R124 | | SW218 | |

FIG. 35

| HBA | RAIDWWPN | RAIDWWPN | LUN | SWITCH INFORMATION (CASCADE CONNECTION) 226 | | |
|---|---|---|---|---|---|---|
| | | | | SW WWPN | | BETWEEN SW AND SW |
| HBA105 | RAID 120 | R121 | 0-255 | FIRST SW INFORMATION IS UNNECESSARY IN CASE OF CASCADE CONNECTION | SW215 | SWWPNA |
| | | R122 | | | SW216 | SWWPNB |
| | | R123 | | | SW217 | SWWPNC |
| | | R124 | | | SW218 | SWWPND |
| HBA106 | RAID 120 | R121 | 0-255 | | SW215 | INFORMATION BETWEEN SW AND SW IS SET IN CASE OF CASCADE CONNECTION |
| | | R122 | | | SW216 | |
| | | R123 | | | SW217 | |
| | | R124 | | | SW218 | |
| HBA107 | RAID 120 | R121 | 0-255 | | SW215 | |
| | | R122 | | | SW216 | |
| | | R123 | | | SW217 | |
| | | R124 | | | SW218 | |
| HBA108 | RAID 120 | R121 | 0-255 | | SW215 | |
| | | R122 | | | SW216 | |
| | | R123 | | | SW217 | |
| | | R124 | | | SW218 | |

FIG. 36

| CONFIGUR-ATION NUMBER | OBJECT LUN | CONFIGURATION INFORMATION | | | | | | STATUS MANAGEMENT |
|---|---|---|---|---|---|---|---|---|
| | LUN No | HBANo | HBANo | SWWPNNo | | | | STATUS MANAGEMENT |
| 1 | LUN 125 | 105 | 111 | SWWPNA | SWWPNC | 215 | R121 | UNWORKABLE |
| 2 | | | | | | 216 | R122 | WORKABLE |
| 3 | | | | | | 217 | R123 | WORKABLE |
| 4 | | | | | | 218 | R124 | WORKABLE |
| 5 | | | | SWWPNB | SWWPND | 215 | R121 | UNWORKABLE |
| 6 | | | | | | 216 | R122 | WORKABLE |
| 7 | | | | | | 217 | R123 | WORKABLE |
| 8 | | | | | | 218 | R124 | WORKABLE |
| 9 | LUN 125 | 106 | 112 | SWWPNA | SWWPNC | 215 | R121 | UNWORKABLE |
| 10 | | | | | | 216 | R122 | WORKABLE |
| 11 | | | | | | 217 | R123 | WORKABLE |
| 12 | | | | | | 218 | R124 | WORKABLE |
| 13 | | | | SWWPNB | SWWPND | 215 | R121 | UNWORKABLE |
| 14 | | | | | | 216 | R122 | WORKABLE |
| 15 | | | | | | 217 | R123 | WORKABLE |
| 16 | | | | | | 218 | R124 | WORKABLE |
| 17 | LUN 125 | 107 | 113 | SWWPNA | SWWPNC | 215 | R121 | UNWORKABLE |
| 18 | | | | | | 216 | R122 | WORKABLE |
| 19 | | | | | | 217 | R123 | WORKABLE |
| 20 | | | | | | 218 | R124 | WORKABLE |
| 21 | | | | SWWPNB | SWWPND | 215 | R121 | UNWORKABLE |
| 22 | | | | | | 216 | R122 | WORKABLE |
| 23 | | | | | | 217 | R123 | WORKABLE |
| 24 | | | | | | 218 | R124 | WORKABLE |
| 25 | LUN 125 | 108 | 114 | SWWPNA | SWWPNC | 215 | R121 | UNWORKABLE |
| 26 | | | | | | 216 | R122 | WORKABLE |
| 27 | | | | | | 217 | R123 | WORKABLE |
| 28 | | | | | | 218 | R124 | WORKABLE |
| 29 | | | | SWWPNB | SWWPND | 215 | R121 | UNWORKABLE |
| 30 | | | | | | 216 | R122 | WORKABLE |
| 31 | | | | | | 217 | R123 | WORKABLE |
| 32 | | | | | | 218 | R124 | WORKABLE |

FIG. 37

| ROUTE CHECK NUMBER | DETERMINATION CHANNEL | | | | | | |
|---|---|---|---|---|---|---|---|
| TUR-1 | HBA105 | SW111 | SWWPNA | SWWPNC | SW215 | R121 | LUN125 |
| TUR-2 | HBA106 | SW112 | SWWPNA | SWWPNC | SW215 | R121 | LUN125 |
| TUR-3 | HBA105 | SW111 | SWWPNA | SWWPNC | SW216 | R122 | LUN125 |
| TUR-4 | HBA105 | SW111 | SWWPNA | SWWPNC | SW215 | R121 | LUN126 |
| TUR-5 | HBA105 | SW111 | SWWPNB | SWWPND | SW215 | R121 | LUN125 |
| TUR-6 | HBA106 | SW112 | SWWPNB | SWWPND | SW215 | R121 | LUN125 |
| TUR-7 | HBA105 | SW111 | SWWPNB | SWWPND | SW216 | R122 | LUN125 |
| TUR-8 | HBA105 | SW111 | SWWPNB | SWWPND | SW215 | R121 | LUN126 |
| TEST-1 | HBA106 | SW112 | SWW111 | SWW112 | HBA106 | | |
| TEST-2 | HBA106 | SW112 | SWW111 | SWW112 | HBA106 | | |
| TEST-3 | HBA105 | SW112 | SWWPNA | SWWPNC | SWWPNA | | |
| TEST-4 | HBA106 | SW112 | SWWPNA | SWWPNC | SW215 | SWWPNC | HBA106 |
| TEST-5 | HBA106 | SW112 | SWW111 | SWW112 | HBA106 | SW122 | SW112 |
| TEST-6 | HBA106 | SW112 | SWWPNB | SWWPND | HBA106 | | |
| TEST-7 | HBA106 | SW112 | SWWPNB | SWWPND | SWWPNB | | SW122 | HBA106 |
| TEST-8 | HBA106 | SW112 | SWWPNB | SWWPND | SW215 | SWWPND | SW112 |

INFORMATION PROCESSING APPARATUS AND METHOD OF CONTROLLING THE INFORMATION PROCESSING APPARATUS

CROSS-REFERENCE TO RELATED APPLICATION

This application relates to and claims priority from Japanese Patent Application NO. 2004-063959, filed on Mar. 8, 2004, the entire disclosure of which is incorporated herein by reference.

BACKGROUND OF THE INVENTION

The present invention relates to an information processing apparatus and a method of controlling the information processing apparatus.

In recent years, there has been implemented an information processing system in which an information processing apparatus is configured to be connected to a storage device, such as a disk array device, via a network, such as SAN (Storage Area Network), so that they may be communicated. In such an information processing system, the connection between the information processing apparatus and the storage device is performed via a switch, and data to be stored in the storage device is read and written through a communication channel which is selected as required according to a communication algorithm. The above information processing system is disclosed, for example, in a Japanese Patent Application No. 2003-167794.

SUMMARY OF THE INVENTION

In the above configuration, when reading and writing of the data stored in the storage fails to performed in a normal way, it is difficult, and takes a lot of time and efforts to investigate a fault location in the communication channel. The longer time is taken for the investigation of the fault location, the availability of the information processing system will be more reduced. Therefore, a technology is eagerly required that enables the investigation of the fault location in a shorter time.

The present invention has been made with a view to the above fault locations, and it is a main object to provide the information processing apparatus and method of controlling the information processing apparatus.

Present invention, for the purpose of solving the above fault locations, relates to the information processing apparatus in an information processing system that comprises: an information processing apparatus having a plurality of first communication ports; a switch having a plurality of second communication ports; and a storage device having a plurality of third communication ports and a plurality of storage volumes, wherein the first communication ports and the third communication ports are connected to the second communication ports in one-to-one so that they can communicate with each other. The information processing apparatus comprises: a first data input/output request transmitting unit for transmitting a first data input/output request via a first communication channel, which extends from a first communication port to a first storage volume and is specified by a first path, which is specified by an identifier of the first communication port and an identifier of the second communication port connected to the first communication port, a second path, which is specified by an identifier of the third communication port and an identifier of the second communication port connected to the third communication port, and a third path, which is specified by an identifier of the third communication port and an identifier of said first storage volume; a second data input/output request transmitting unit for transmitting a second data input/output request via a second channel extending to the first storage volume in which the first path is the same as that of the first communication channel, and the second and third paths are different from those of the first communication channel, and for transmitting a third data input/output request via a third communication channel extending to the second storage volume in which the first and second paths are the same as those of the first communication channel, and the third path is different from that of the first communication channel, when a response from the storage device to the first data input/output request is not received within a predetermined time period; an inspection request transmitting unit for transmitting from the first communication port, which is different from the first communication port on the first communication channel, to the switch a first inspection request to inspect the second communication port connected to the first communication port on the first communication channel, and a second inspection request to inspect the second communication port connected to the third communication port on the first communication channel; and a fault investigating unit for determining that there is a fault location in the first communication port, when a response from the storage device to the third data input/output request which was transmitted via the third communication channel is not received within a predetermined time period, a response from the storage device to the second data input/output request which was transmitted via the second communication channel is not received within a predetermined time period, and a response from the switch to the first inspection request is not received within a predetermined time period.

Fault locations disclosed in the present application and solutions to the same will be described in the most preferred embodiments set forth below together with accompanying drawings.

The present invention may provide the information processing apparatus and the method of controlling the same.

BRIEF DESCRIPTION OF THE DRAWINGS

FIG. 8 shows a storage device configuration information management table relating to the present embodiments;

FIG. 9 shows a switch configuration information management table relating to the present embodiments;

FIG. 10 shows an HBA driver configuration information management table relating to the present embodiments;

FIG. 11 shows a fault route check map relating to the present embodiments;

FIG. 12 shows a fault route check result relating to the present embodiments;

FIG. 13 shows a fault route check result relating to the present embodiments;

FIG. 14 shows a fault route check result relating to the present embodiments;

FIG. 15 shows a fault route check result relating to the present embodiments;

FIG. 16 shows a fault route check result relating to the present embodiments;

FIG. 17 is a flow chart showing the flow of data input/output processing relating to the present embodiments;

FIG. 25 is a flow chart showing a flow in which a storage device configuration information management table is acquired by the information processing apparatus relating to the present embodiments;

FIG. 26 is a flow chart showing a flow in which the information processing apparatus relating to the present embodiments makes the storage device investigate a fault in a communication port;

FIG. 27 shows a storage device port check table relating to the present embodiments;

FIG. 28 shows a storage device configuration information management table relating to the present embodiments;

FIG. 29 shows a flow of processing in which a switch configuration information management table is acquired by the information processing apparatus relating to the present embodiments;

FIG. 33 shows an HBA basic configuration information table relating to the present embodiments;

FIG. 35 shows an HBA basic configuration information table relating to the present embodiments;

FIG. 36 shows an HBA driver configuration information management table relating to the present embodiments; and FIG. 37 shows a fault route check map relating to the present embodiments.

DESCRIPTION OF THE EMBODIMENTS

An Example of the Entire Configuration

Figure 1:
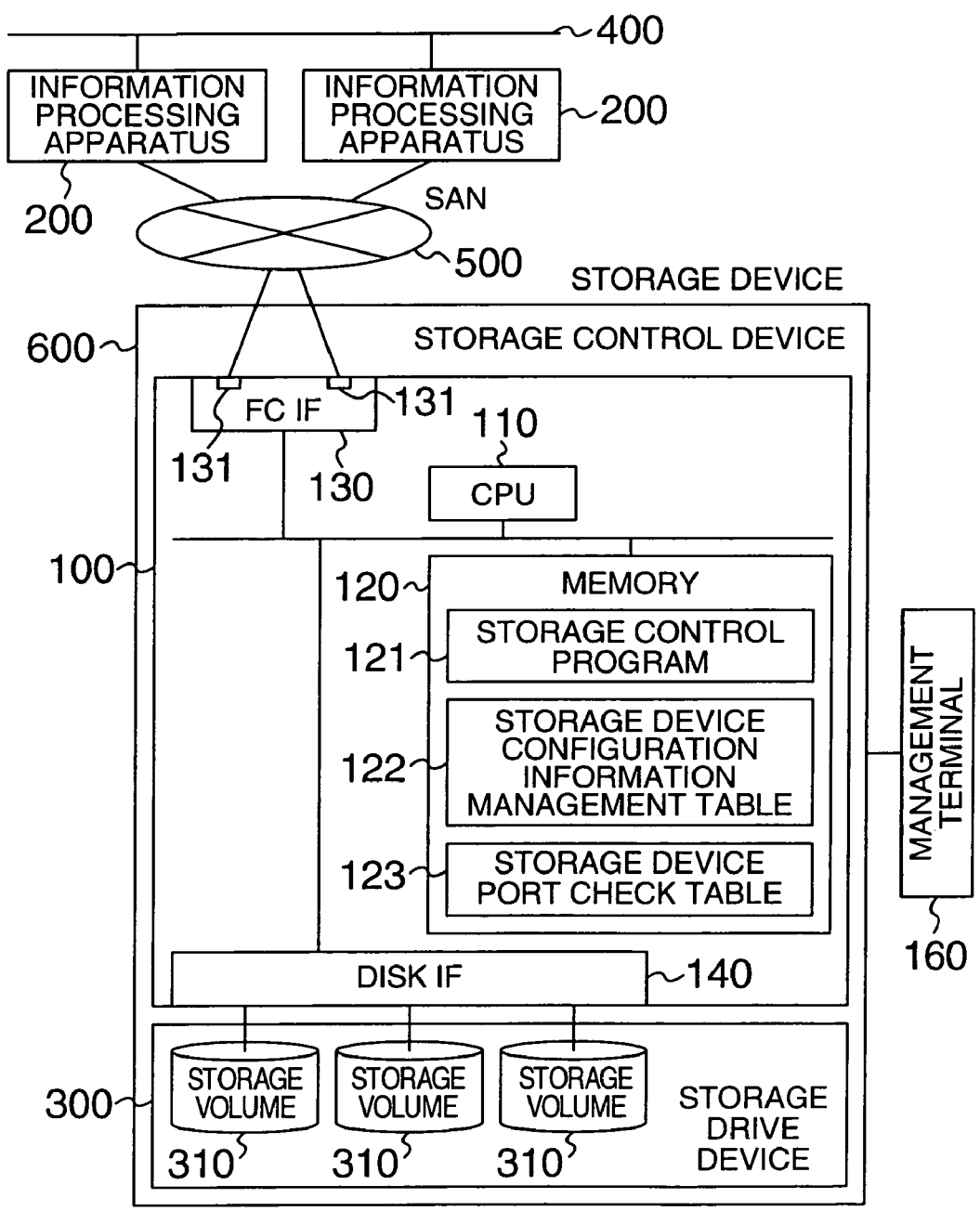
FIG. 1 is a block diagram showing an entire configuration of an information processing system relating to the present embodiments.

First, FIG. 1 is a block diagram showing the entire configuration of the information processing system relating to the present embodiments. In the information processing system relating to the present embodiments, the information processing apparatus 200 and a storage device 600 are connected via a SAN (Storage Area Network) 500 so that they may communicate with each other.

The information processing apparatus 200 is an information equipment that utilizes a storage source provided by storage volumes 310 which are comprised by the storage 600 to provide various information processing services. The information processing services provided by the information processing apparatus 200 may include, for example, an automated teller machine service by banks or an aircraft's seat reservation service.

The storage volumes 310 are storage areas for storing data including a physical volume, which is a physical storage area provided by a hard disk drive or the like, and a logical volume, which is a storage area that is logically set on the physical volume.

The information processing apparatus 200 may be connected to other information processing apparatus 200 via LAN (Local Area Network) 400 so that they may communicate with each other. Here, the LAN 400 may be, for example, the Internet. The LAN may also be a private communication network.

The SAN 500 is a network that connects the information processing apparatus 200 and storage device 600 so that they may communicate with each other. The SAN 500 is configured to comprise a switch 510 having a plurality of communication ports (second communication ports). The information processing apparatus 200 and storage 600 are each connected to the communication ports 512 of the switch 510 via communication cables 520.

It should be noted that the information processing apparatus 200 and storage device 600 may be connected via a network using a communication protocol such as FICON (Fibre Connection) (TM), ESCON (Enterprise System Connection) (TM), ACONARC (Advanced Connection Architecture) (TM), FIBARC (Fibre Connection Architecture) (TM), iSCSI (Internet Small Computer Systems Interface), or the like, besides the SAN 500.

While it is difficult to investigate a fault that may occur on a communication channel in the information processing system in which the information processing apparatus 200 and storage device 600 are connected via the SAN 500, it is possible to investigate the fault and indicate the location of the fault by a mechanism, which will be described later, according to the information processing apparatus 200 relating to the present embodiments.

Information Processing Apparatus

Figure 2:
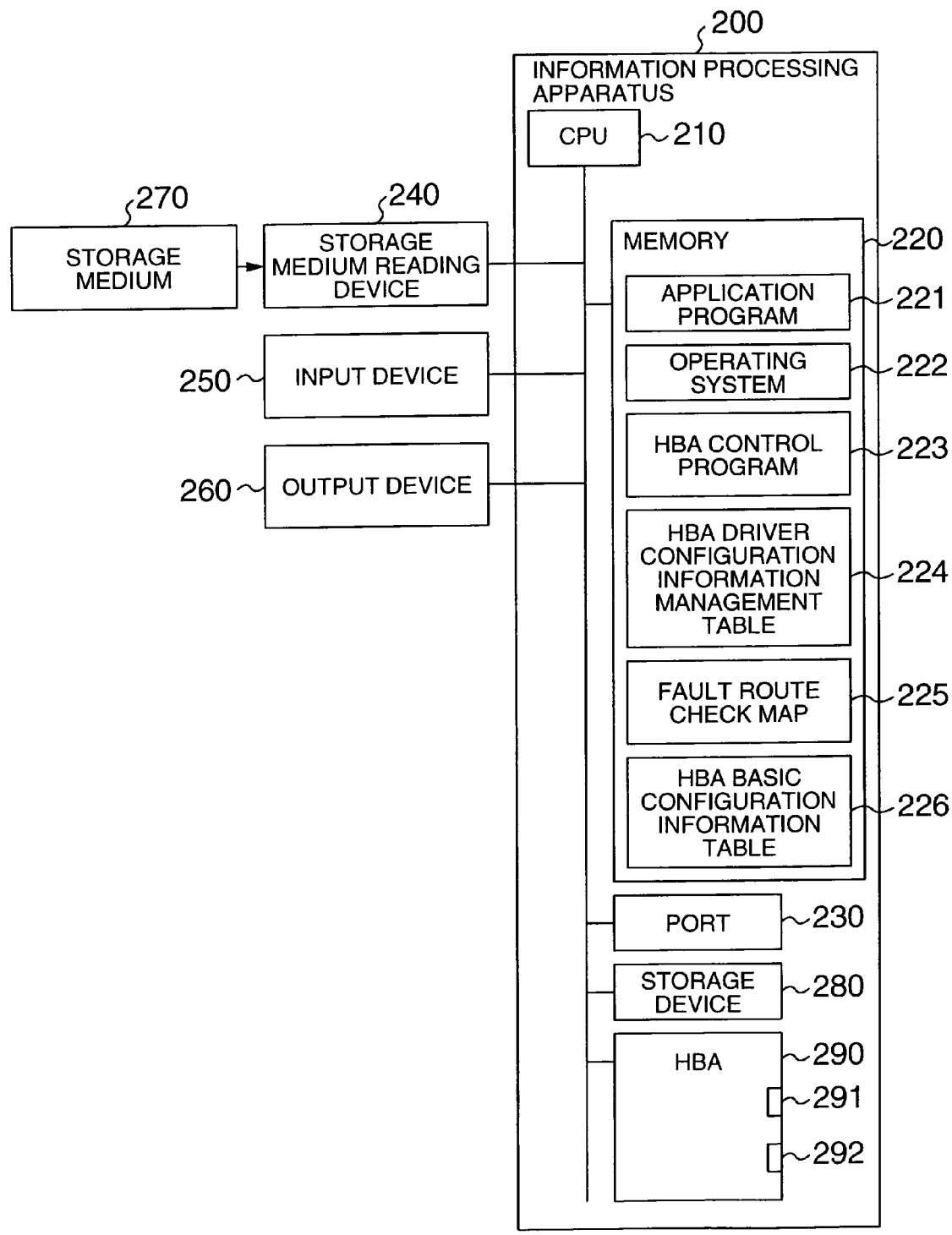
FIG. 2 is a block diagram showing the configuration of the information processing apparatus relating to the present embodiments.

FIG. 2 is a block diagram showing the information processing apparatus 200 relating to the present embodiments. The information processing apparatus 200 comprises a CPU 210, a memory 220, a port 230, a storage medium reading device 240, an input device 250, an output device 260, a storage device 280, and an HBA (Host Bus Adapter) 290.

The CPU 210 is responsible for controlling the entire information processing apparatus 200. It runs an application program 221 stored in the memory 220 to provide aforementioned various information processing services. The CPU 210 also runs an operating system 222 (also referred to as OS222 hereinafter) comprising a cord for performing various operations relating to the present embodiments, and an HBA control program 223. A first data input/output request transmission unit, a second data input/output request transmission unit, an inspection request transmission unit, a fault investigation unit, and a determination indication unit are implemented by the operating system 222 and HBA control program 223 which are run by the CPU 210.

An HBA driver configuration information management table 224, a fault route check map 225 and the HBA basic configuration information table 226 are stored in the memory 220. Details for these will be described later. It should be noted that the HBA control program 223 and operating system 222 may be an independent program, or at least one portion of these programs may comprise the same program. The respective program may also be configured to comprise a plurality of programs.

The storage medium reading device 240 is a device for reading a program or data stored in a storage medium 270. The read program or data are stored in the memory 220 or storage device 280. Therefore, the HBA control program 223 or operating system 222 recorded in, for example, the storage medium 270 may be read from the storage medium 270 using the storage medium reading device 240 for storage in the memory 220 or storage device 280. The storage medium 270 may use a flexible disk, a magnetic tape, a CD-ROM, a semiconductor memory or the like. The storage medium reading device 240 may be a device, internal or external to the information processing apparatus 220. The storage device 280 may be, for example, a hard disk device or a semiconductor storage device, or the like. The HBA control program 223, operating system 222, HBA driver configuration information management table 224, fault route check map 225, and HBA basic configuration information table 226 may also be stored in the storage device 280. The input device 250 is a user interface used by an operator or the like for inputting data and the like. The input device 250 may use, for example, a keyboard, a mouse, and the like. The output device 260 is a user interface for outputting information outside. The output device 260 may use, for example, a display, a printer, or the like. The port 230 is a device for performing communication. The communication with the other information processing apparatus 200 via the LAN 400 may be performed via, for example, the port 230. For example, the application program 221, HBA control program 223, or operating system 222 can also be received from other information processing apparatus 200 via the port 230 for storage in the memory 220 or storage device 280. The HBA 290 is a device for allowing the information processing apparatus 200 to transmit and receive data to and from the storage device 600. The HBA 290 comprises a communication port (a first communication port) 291, through which the information processing device 200 transmits a data input/output request to the storage device 600 and receives a response from the storage device 600. It should be noted that while the information processing apparatus 200 illustrated in FIG. 2 is configured to comprise one HBA having two communication ports 291, the information processing apparatus 200 may be configured to comprise a plurality of HBAs 290. In that event, each HBA 290 may have one communication port 291. The communication ports 291 comprised by the HBA 290 is connected to the communication ports 512 comprised by the switch 510 in one-to-one so that they can communicate with each other. Further, the HBA 290 may be a device, internal or external to the information processing apparatus 200. When the information processing apparatus 200 is connected to the storage device 600 via a plurality of communication channels so that they can communicate with each other, the running of the HBA control program 223 would control which one of the communication ports 291 is to be used for the communication between the information processing apparatus 200 and storage device 600.

Storage Device

Next, the storage device 600 relating to the present embodiments will be described with reference to FIG. 1. The storage device 600 comprises a storage control device 100, a storage drive device 300, and a management terminal 160.

The storage control device 100 communicates with the information processing apparatus 200 to control reading data and writing data from and to the storage volume 310 comprised by the storage drive device 300. For example, when the storage control device 100 receives a request to write data to the storage volume 310 from the information processing apparatus 200, it writes data to the storage volume 310 comprised by the storage drive device 300. Furthermore, when the storage control device 100 receives a request to read out data stored in the storage volume 310 from the information processing apparatus 200, it reads the data stored in the storage volume 310 comprised by the storage drive device 300. The storage control device 10 comprises a CPU 110, memory 120, FC I/F (Fibre Channel Interface) 130, and disk I/F (Disk Interface) 140.

The CPU 110 is responsible for controlling the entire storage control device 100 and runs a storage control program 121, which is stored in the memory 120 and comprises code for performing various operations. The storage control program 121 is run by the CPU 110 to control reading data and writing data from and on the above storage volume 310. A storage device configuration information management table 122 and a storage device port check table 123 are also stored in the memory 120. Details for these will be described later. It should be noted that the storage control program 121 may comprise a plurality of programs. The FC I/F 130 comprises a communication port (a third communication port) 131 which serves as an interface for communicating with the information processing apparatus 200. While in FIG. 1, the storage control device 100 is configured to comprise one FC I/F 130 having two communication ports 131, it may be configured to comprise a plurality of FC I/Fs 130. In that event, each FC I/F 130 may have one communication port 131. The communication ports 131 of the FC I/F 130 is connected to the communication ports 512 of the switch 510 in one-to-one so that they may communicate with each other. The disk I/F 140 has an interface for delivering data and receiving data to and from the storage drive device 300.

The storage drive device 300 has a plurality of storage volumes 310 for storing data therein. The storage volume 310 is a storage area including a physical volume, which is a physical storage area provided by a hard disk drive and the like, and a logical volume, which is a storage area logically set on the physical volume.

The management terminal 160 is an information device for maintaining and managing the storage device 600. The management terminal may be internal or external to the storage device 600. Further, the management terminal 160 may be a computer dedicated to the maintenance and management of the storage device 600, or a general-purpose computer with maintaining and managing functions added therewith. The management terminal 160 may also be configured to be connected to the information processing apparatus 200 via, for example, the LAN 400, so that they may communicate with it.

Location of Fault

Next, the location of a fault on a communication channel (a first communication channel), through which a data input/output request is transmitted from the information processing apparatus 200 relating to the present embodiments to the storage volume 310 comprised by the storage device 600, will be described with reference to FIG. 3 through FIG. 7.

The information processing apparatus 200 comprises HBA105 (290), HBA106 (290), HBA107 (290), and HBA108 (290). Here, an example, in which each HBA290 has one communication port 291, is described. Therefore, the communication port 291 comprised by the HBA 290 is sometimes referred to only as HBA290 in the following description. When the HBA control program 223 receives an instruction to transmit a data input/output request from the application program 221 via the operating system 222, it selects any one of these HBA290 to transmit the data input/output request to the switch 510. The selection of the HBA290 by the HBA control program 223 may be performed sequentially in a round-robin manner, or in an increasing order of processing load.

On the other hand, the switch 510 comprises a plurality of communication ports (second communication ports) 512, a control unit 511, and a memory 513. The switch 510 comprises 8 communication ports 512, SW111 (512) to SW118 (512). SW111 (512) to SW114 (512) are connected to HBA105 (290) to HBA108 (290) of the information processing apparatus 200, respectively, via communication cables 520 in one-to-one. Furthermore, SW115 (512) to SW118 (512) are connected to R121 (131) to R124 (131), which are communication ports 131 of the FC I/F (130) comprised by the storage device 600, respectively, in one-to-one.

The control unit 511 is responsible for controlling the switch 510. Data or a table necessary for the control unit 511 to control the switch 510 are stored in the memory 513. A switch information management table 514 is also stored in the memory 513 relating to the present embodiments. Detail will be described later.

The storage device 600, as described above, comprises a plurality of communication ports 131 and a plurality of storage volumes 310. The storage device 600 also comprises communication ports 131, R121 (131) to R124 (131), and storage volumes LUN (Logical Unit Number) 125 (310) to LUN 130 (310).

FIGS. 3 to 7 illustrate an example in which a data input/output request (a first data input/output request) is transmitted from the HBA105 (290) of the information processing apparatus 200 to the LUN125 (310) through the SW111 (512) and SW115 (512) of the switch 510, and R121 of the storage device 600. In this way, the communication channel from the information processing apparatus 200 to the storage volume 310 is specified by a first path which is specified by an identifier (for example, HBA105) of the communication port 291 of the HBA290 and an identifier (for example, SW111) of the communication port 512 of the switch 510 connected to the communication port 291, a second path which is specified by an identifier (for example, R121) of the communication port 131 of the storage device 600 and an identifier (for example, SW115) of the communication port 512 of the switch 510 connected to the communication port 131, and a third path which is specified by an identifier (for example, R121) of the communication port 131 of the storage device 600 and an identifier (for example, LUN125) of its storage volume 310. Here, the identifier of the communication port 291 of the HBA290 may be, for example, WWPN (World Wide Port Name). The identifier of the communication port 512 of the switch 510 may also be, for example, WWPN. Similarly, the identifier of the communication port 131 of the storage device 600 may also be WWPN. The identifier of the storage volume 310 may be, for example, LUN (Logical Unit Number).

If no fault occurs on a communication channel from the information processing apparatus 200 to the storage volume 310 comprised by the storage device 600, a data input/output request from the information processing apparatus 200 is transmitted to the storage device 600. After the data to be stored in the storage volume 310 of the storage device is read or written, a response to the data input/output request is transmitted from the storage device 600 to the information processing apparatus 200. When the data input/output request is a data reading request, the content of the response may include read data, and when the data input/output request is a data writing request, the content of the response may include data indicating whether data writing to the storage volume 310 has correctly been performed.

After the information processing apparatus 200 transmitted a data input/output request, it waits a response thereof to be transmitted from the storage device 600. If the information processing apparatus 200 does not receive the response from the storage device 600 within a predetermined time period, it determines that a fault of some kind may have occurred on the communication channel.

Figure 3:
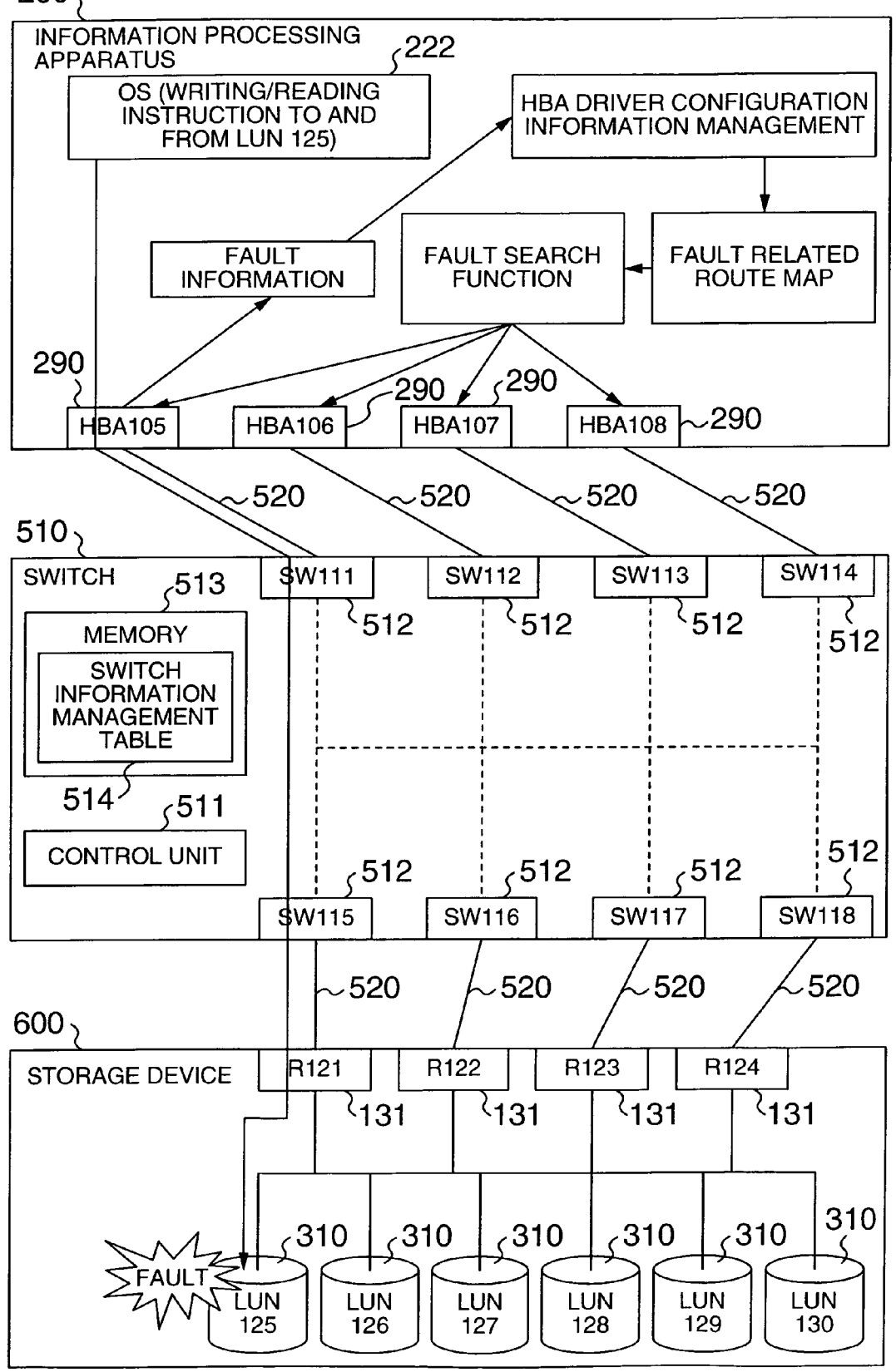
FIG. 3 is a diagram showing the location of a fault relating to the present embodiments.
Figure 4:
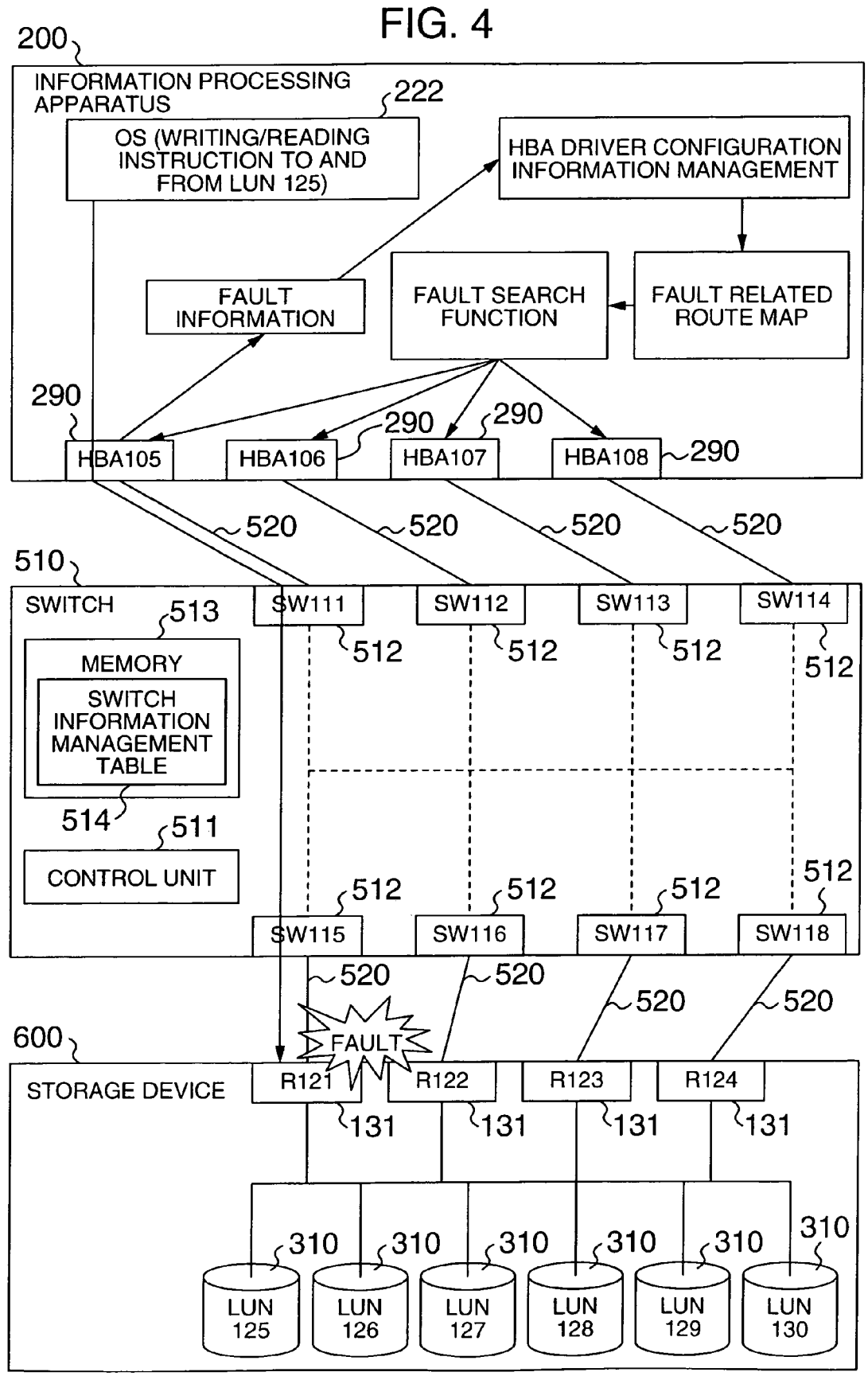
FIG. 4 is a diagram showing the location of a fault relating to the present embodiments.
Figure 5:
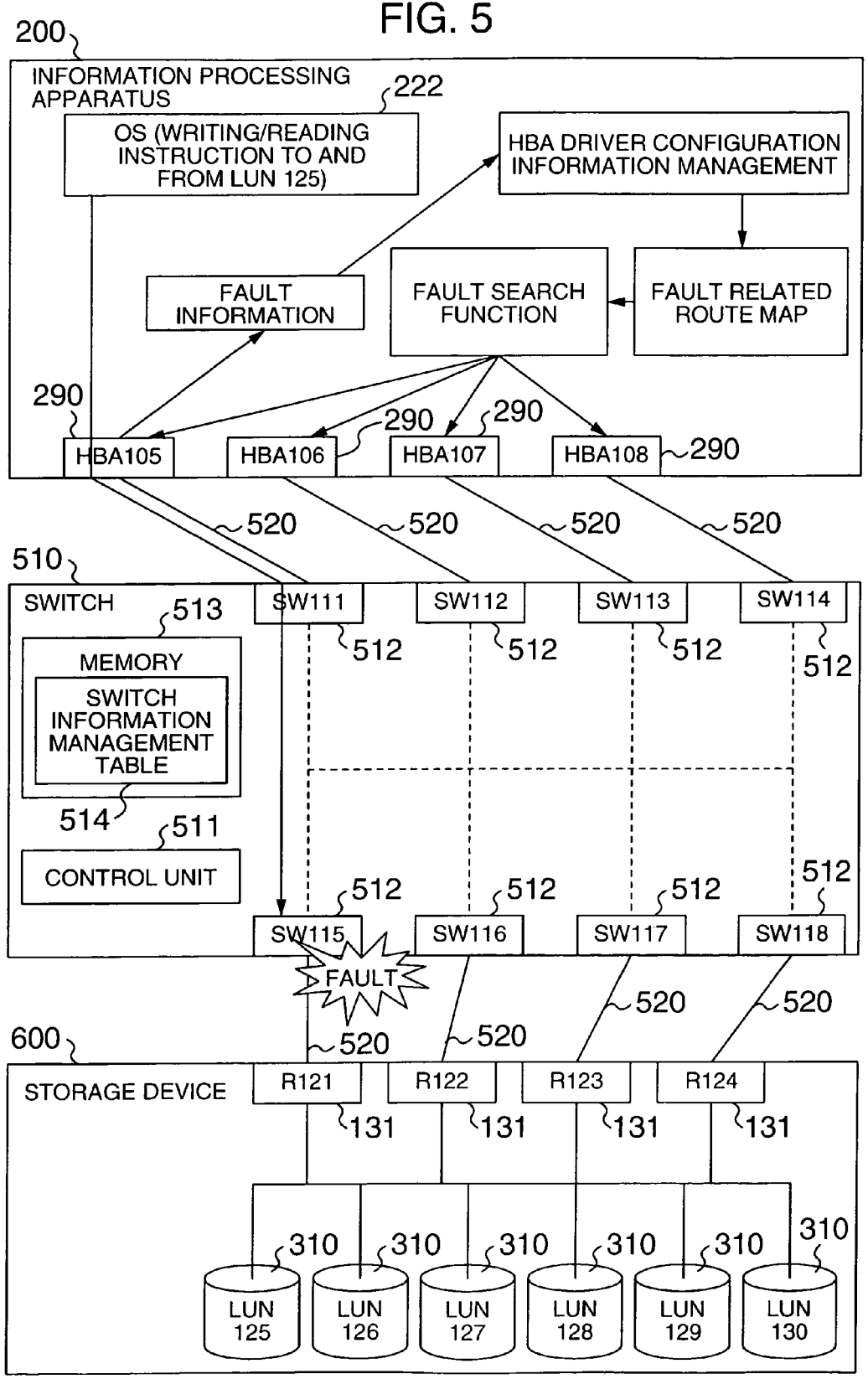
FIG. 5 is a diagram showing the location of a fault relating to the present embodiments.
Figure 6:
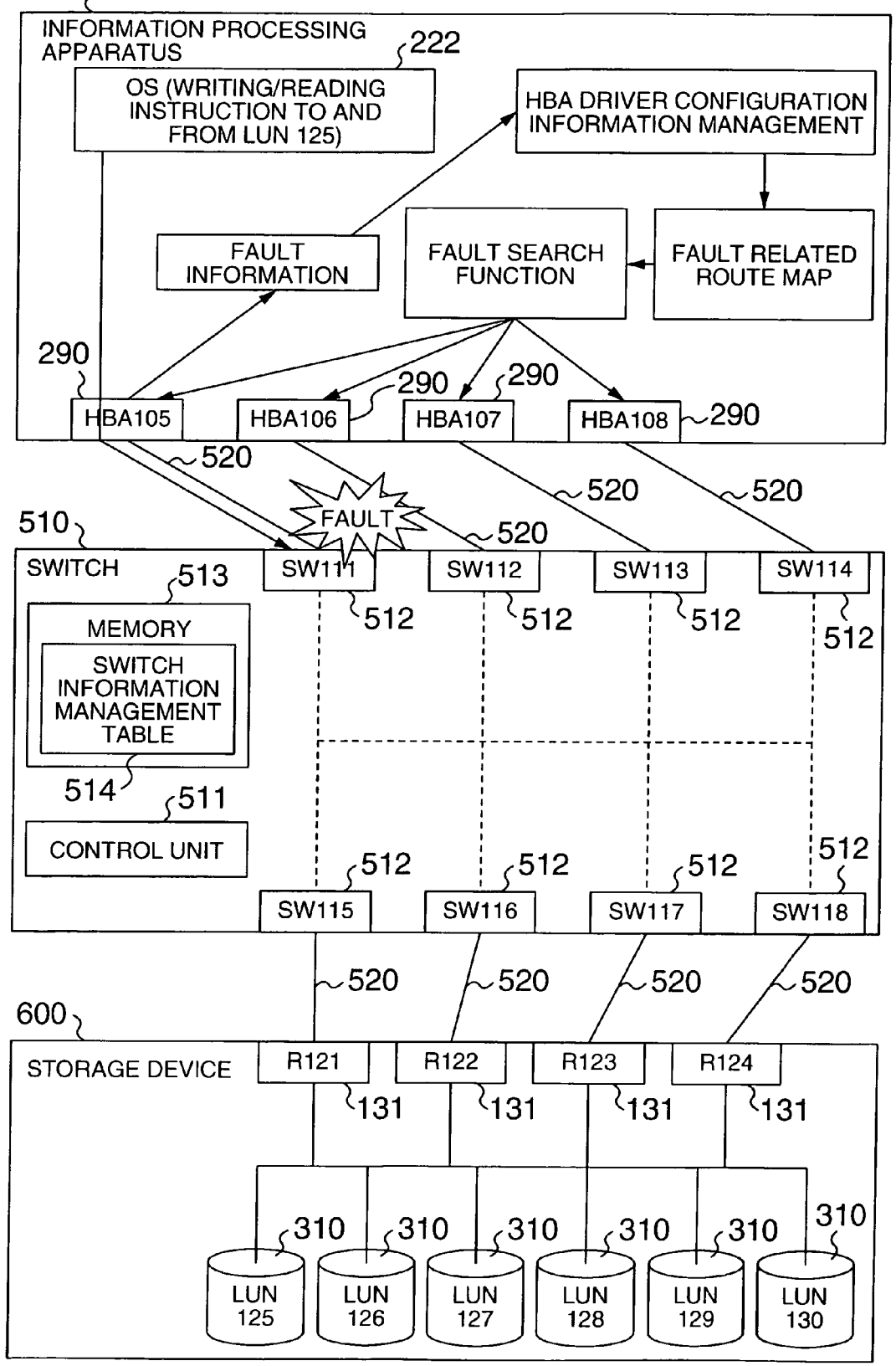
FIG. 6 is a diagram showing the location of a fault relating to the present embodiments.
Figure 7:
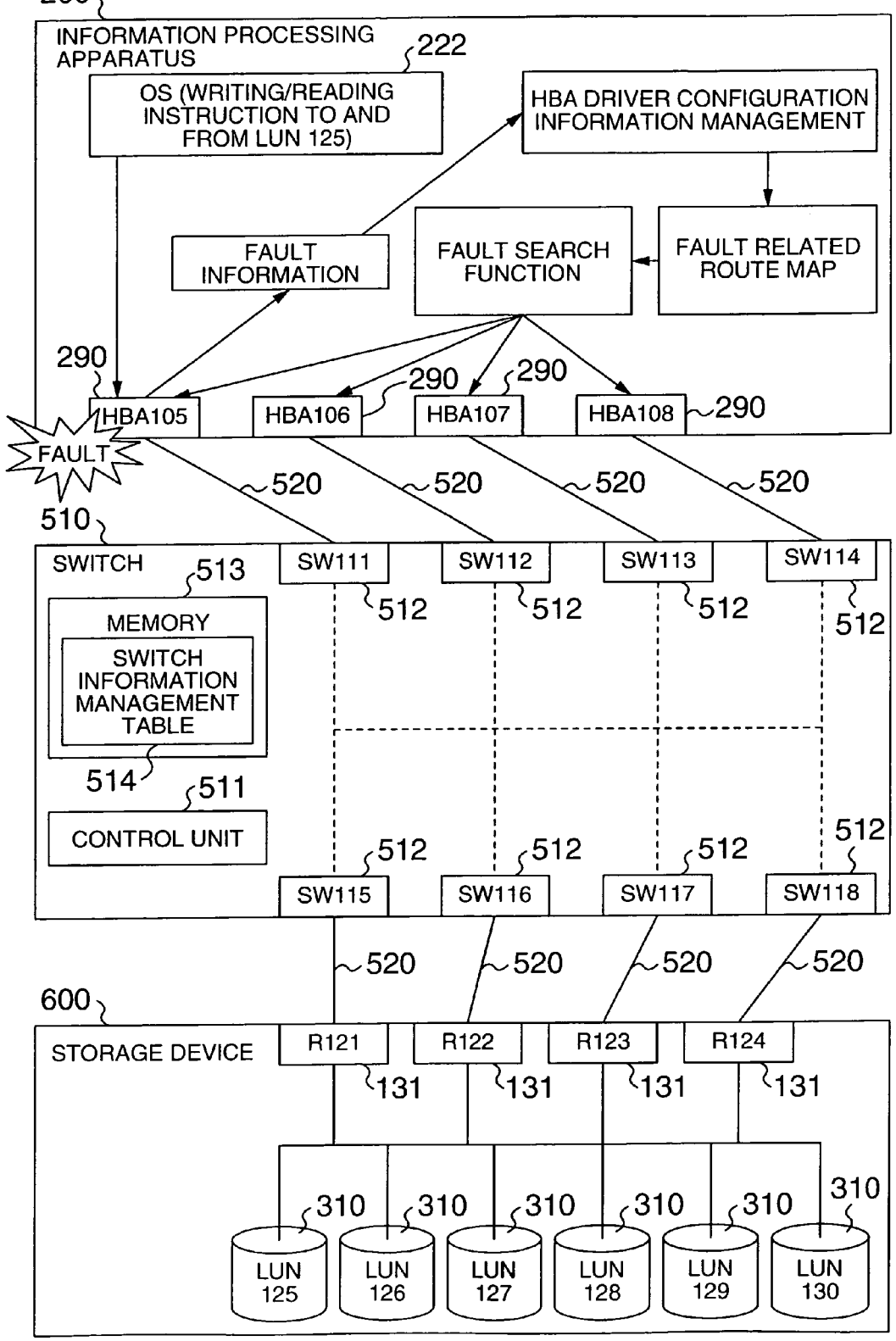
FIG. 7 is a diagram showing the location of a fault relating to the present embodiments.

FIG. 3 shows a case in which the information processing apparatus 200 can not receive a response due to an occurrence of a fault in LUN125 (310). FIG. 4 shows a case in which the information processing apparatus 200 can not receive a response due to an occurrence of a fault in R121 (131). FIG. 5 shows a case in which the information processing apparatus 200 can not receive a response due to an occurrence of a fault in SW115 (512). FIG. 6 shows a case in which the information processing apparatus 200 can not receive a response due to an occurrence of a fault in SW111 (512). FIG. 7 shows a case in which the information processing apparatus 200 can not receive a response due to an occurrence of a fault in HBA105 (290).

Investigation of Fault Locations

As described above, when the information processing apparatus 200 does not receive a response from the storage device 600 within a predetermined time period, it determines that a fault of some kind may have occurred on a communication channel. At this time, the information processing apparatus 200 relating to the present embodiments may investigate the fault. Details will be described below with reference to FIGS. 8 to 23, and 33.

First, a description is given with reference to FIG. 17 to the flow of processing in a case where a data input/output request is transmitted from the information processing apparatus 200 to the storage device 600. When the HBA control program 223 receives a data input/output request from OS222 (S1000), it checks whether the path through which the data input/output request is transmitted has recovered from the state of being degenerate (S1001). The state of being degenerate refers to a state where communication can not be established via the communication channel in question. When the communication channel has recovered from the state of being degenerate, proceed to "Yes", and an instruction to check if the communication channel has recovered from being degenerate is transmitted to the storage device 600 (S1002). The instruction to check if the communication channel has recovered from the state of being degenerate may be, for example, a request to read data. When a response to the instruction to check if the communication channel has recovered from the state of being degenerate (for example, a request to read data) can be normally received, recovery from being degenerate can be confirmed. When the communication channel has not recovered from the state of being degenerate, proceed to "No" at S1001. No recovery from the state of being degenerate refers to a case where the communication channel remains in the state of being degenerate, or it has not been in the state of being degenerate from the beginning. When the communication channel in question remains in the state of being degenerate, proceed to "Yes" at S1003. Then, when another communication channel (another route) to the intended storage volume 310 is available, proceed to "Yes" at S1004 to transmit the data input/output request received from the OS222 to the storage device 600 via another route (S1006). On the other hand, when another route is unavailable, it is impossible to transmit the input/output request from the information processing apparatus 200 to the storage device 600. Therefore, proceed to "No" at S1004 to report the fault to the OS222. Further, when the communication channel has not been in the state of being degenerate from the beginning, proceed to "No" at S1003 to transmit the input/output request received from the OS222 to the storage device 600 (S1006).

Figure 18:
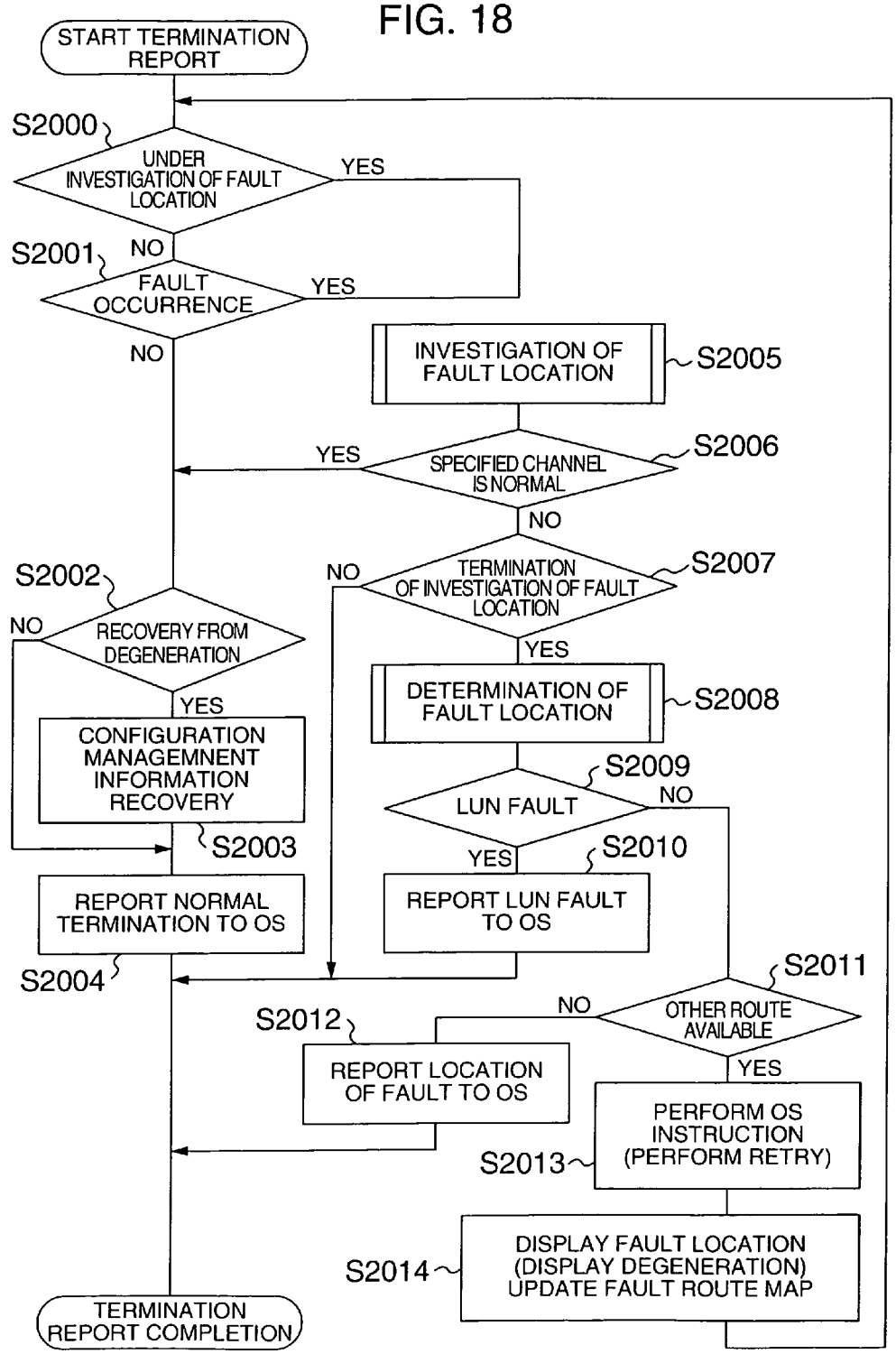
FIG. 18 is a flow chart showing the flow of investigating a fault relating to the present embodiments.

After the information processing apparatus 200 transmits the data input/output request, or instruction to check the recovery from the degenerate state to the storage device 600, a response to the data input/output request or to the instruction to check the recovery from the degenerate state is transmitted. Processing during receiving the response from the storage device 600 is illustrated in FIG. 18.

First, the HBA control program 223 determines whether a fault is being investigated at S2000 (S200). "A fault is being investigated" refers to that fault investigation processing at S2005 is under way. As described later, the execution of the processing at S3012 in FIG. 19 would enter into the state of fault investigation. Then, the execution of the processing S3015 in FIG. 19 would terminate the state of fault investigation. When not in the state of fault investigation, proceed to "No". Then, when the response from the storage device 600 to the data input/output request is normally received, proceed to "No" at S2001. Then, when the communication channel, through which the data input/output request is transmitted, has not recovered from the degenerate state, proceed to "No" at S2002 to report normal termination to the OS222. On the other hand, when the communication channel, through which the data input/output request is transmitted, has recovered from the degenerate state, proceed to "Yes" at S2002 to update an HBA driver configuration information management table 224 (S2003). The HBA driver configuration information management table 224 will be described later. When a response from the storage device 600 to the data input/output request is not received within a predetermined time period, proceed to "Yes" at S2001 to investigate a fault (S2005).

Figure 22:
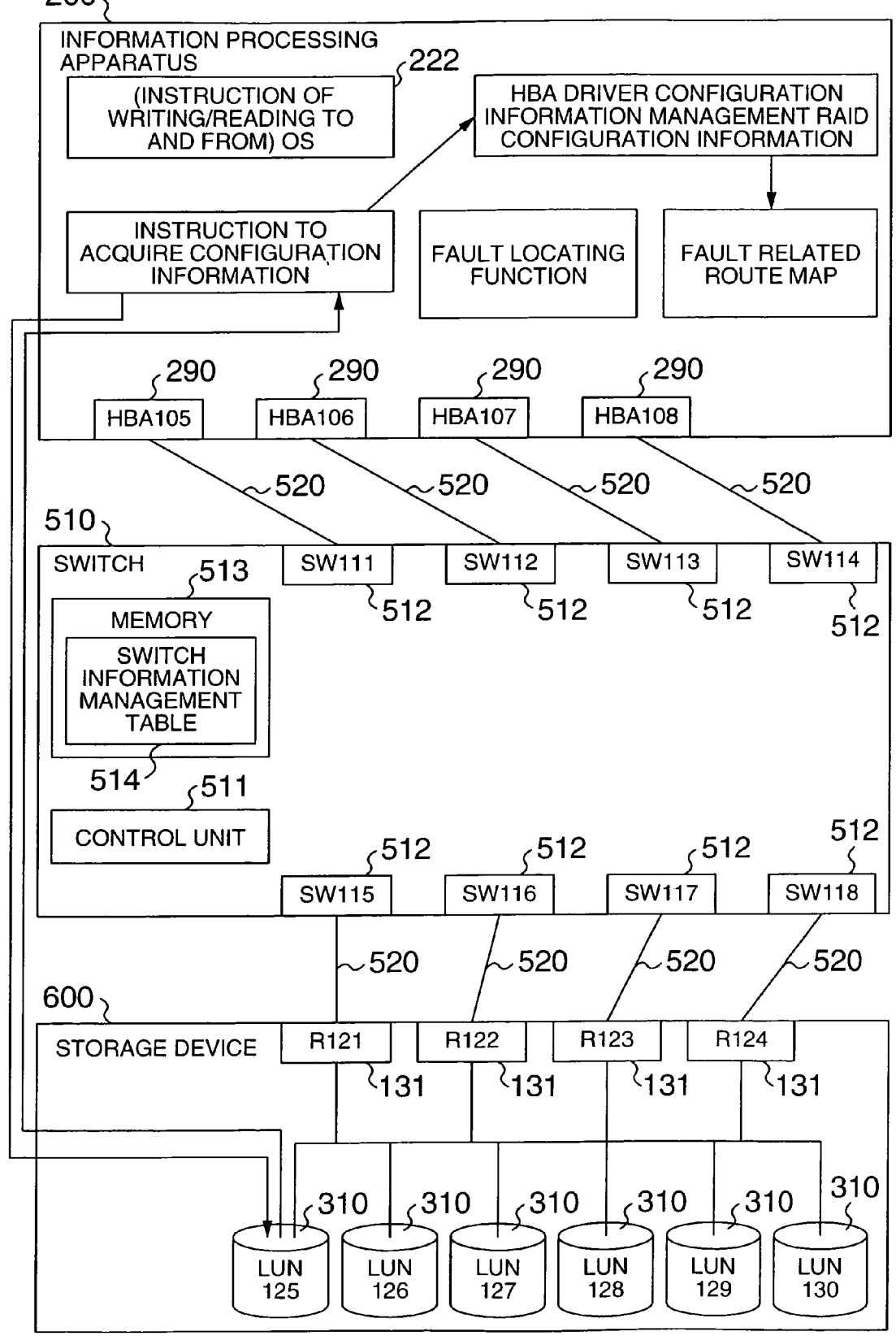
FIG. 22 shows a state in which a storage device configuration information management table is acquired by the information processing apparatus relating to the present embodiments.
Figure 23:
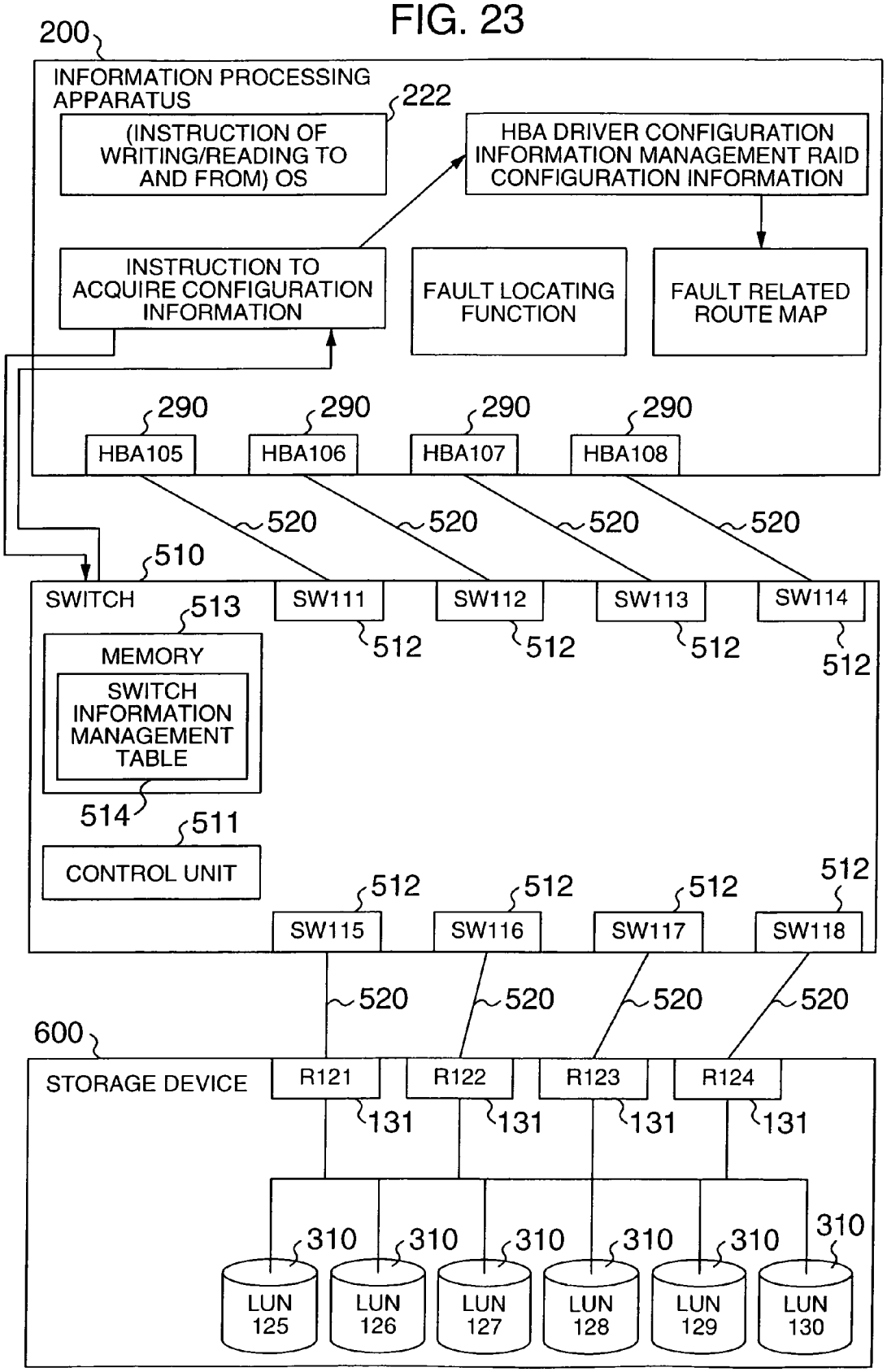
FIG. 23 shows a state in which a switch configuration information management table is acquired by the information processing apparatus relating to the present embodiments.
Figure 24:
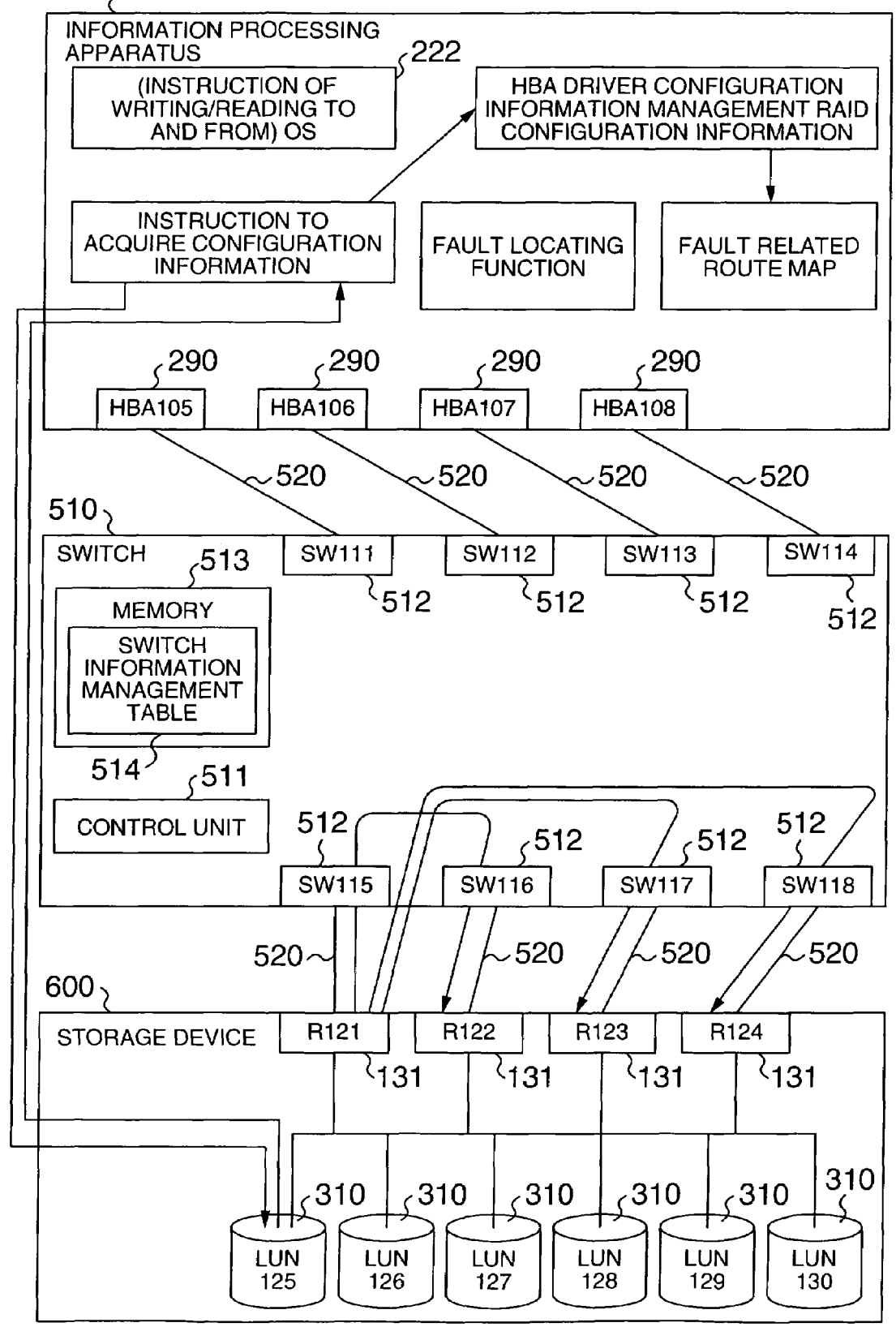
FIG. 24 shows a state in which a fault investigating instruction is transmitted by the information processing apparatus relating to the present embodiments.

In this event, to begin with, the information processing apparatus 200 transmits a transmission requests to the switch 510 and storage device 600 asking to transmit a switch information management table 514 and a storage device configuration information management table 122, respectively. It does not matter which communication channel is used to transmit the switch information management table 514 and storage device configuration information management table 122. They may also be transmitted when a response to the data input/output request is not received, or may previously be transmitted. FIGS. 23 and 22 illustrate how the information processing apparatus 200 transmits requests to the switch 510 and storage device 600 asking to transmit the switch information management table 514 and storage device configuration information management table 122, respectively. Further, each flow chart is illustrated in FIGS. 29 and 25.

The switch information management table 514 is shown in FIG. 9. Identifiers of the communication ports comprised by the switch 510 are described in the switch information management table 514.

The storage device configuration information management table 122 is shown in FIG. 8. Identifiers of the communication ports 131 comprised by the storage device 600 and identifiers the communication ports 512 of the switch 510 which are connected to each communication port 131 so that they may communicate with each other are entered in the storage device configuration information management table 122. Identifiers of the storage volumes 310 which are readable and writable through each communication port 131 are also entered.

The information processing apparatus 200 creates the HBA driver configuration information management table 224 based on the information described in the switch information management table 514 and storage device configuration information management table 122, and the HBA basic configuration information table 226 stored in the memory 220 of the information processing apparatus 200.

The HBA basic configuration information table 226 is information stored on the switch 510 connected to the HBA290 of the information processing apparatus 200 and storage device 600. The HBA basic configuration information table 226 is shown in FIG. 33. In an "HBA" field, identifiers of the HBA290 are entered. In a "RAIDWWNN" field, the identifier of the storage device 600 is entered. Here, for example, WWNN (World Wide Node Name) is entered. In the "RAIDWWPN" field, identifiers of the communication ports 131 of the storage device 600 are entered. In a "LUN" field, identifiers of the storage volumes 310 are entered. In a "switch information" field, identifiers of the switch 510 are entered. In a "SWWWPN" field, identifiers of the communication ports 512 of the switch 510 connected to the communication ports 291, 131 of the information processing apparatus 200 and storage device 600 are entered. Further, in a "SW-SW" field, identifiers of the communication ports 512 connected between the switches 510 when the switches are cascaded are entered.

The HBA driver configuration information management table 224 is created based on the above information. HBA driver configuration information management table 224 is a list of all communication channels from each communication port 291 of the information processing apparatus 200 to each storage volume 310 of the storage device 600. A portion of the created HBA driver configuration information management table 224 is shown in FIG. 10.

The HBA driver configuration information management table 224 comprises a "configuration number" field, an "object LUN" field, a "configuration information" field, and a "status management" field. The "Configuration number" field is a field in which identification number of listed communication channels are entered. The "object LUN" field is a field in which identifiers of the storage volumes 310 are entered. The "configuration information" field is a field in which communication ports 291, 512, and 131 through which each communication channel extends before reaching the storage volume 310 are entered. The "status management" field is a field in which the state of the communication channel is entered. For example, FIG. 10 shows that the communication channel, which is indicated by configuration number 1 and passes through HBA105, SW111, SW115, and R121 before reaching LUN125, can not be used. The "state management" field is filled out based on the result of response to data input/output request such as data reading request, data writing request, or the like, which is transmitted from the information processing apparatus 200 to the storage device 600. As described in connection with S2003 of FIG. 18, in the case of recovery from the degenerate state, the "status management" field of the HBA driver configuration information management table 224 is updated. It should be noted that the HBA driver configuration information management table 224 may be designed to be created when a response to the data input/output request is not received, or it may be designed to be previously created.

Figure 19:
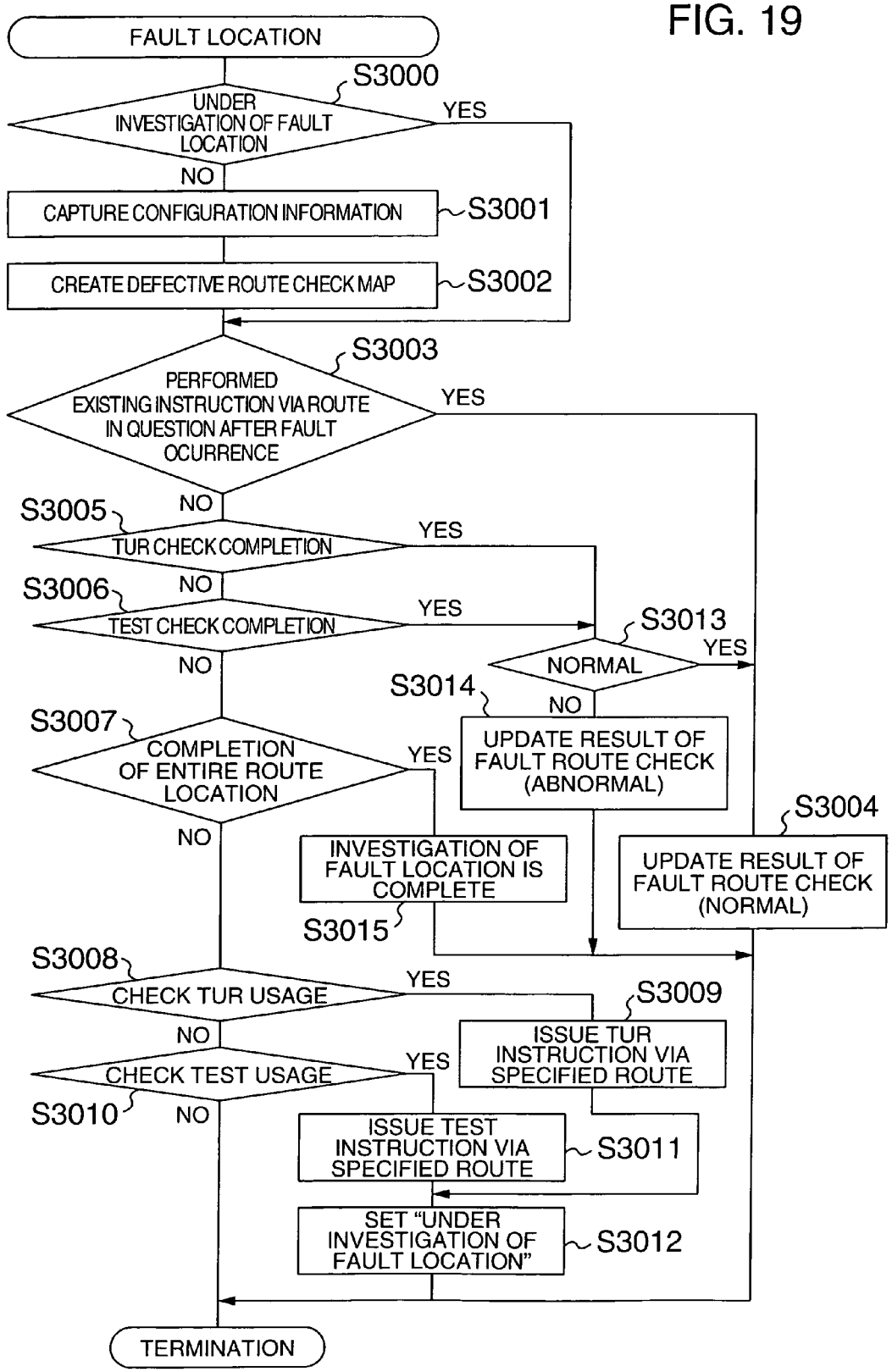
FIG. 19 is a flow chart showing the flow of investigating a fault relating to the present embodiments.

Back to FIG. 18, the information processing apparatus 200 s then tarts the investigation of a fault (S2005). The fault investigation processing is illustrated in FIG. 19. At first, it is determined whether a fault is being investigated (S3000). If not under investigation, then proceed to "No." Then, the information processing apparatus 200 reads or creates the HBA driver configuration information management table 224 (S3001). The information processing apparatus 200 creates a fault route check map 225 based on the HBA driver configuration information management table 224 (S3002). The fault route check map 225 is a table for specifying the communication channel through which the information processing apparatus 200 transmits a data input/output request (a second data input/output request, a third data input/output request) to the storage device 600 so as to investigate a fault, or the cable through which to transmit a inspection request (a first inspection request, a second inspection request) to the switch 510. The fault route check map 225 is shown in FIG. 11.

The fault route check map 225 comprises a "route check number" field, and a "determination path" field. In the "route check" field, the communication channel through which the information processing apparatus 200 transmits the data input/output request to the storage device 600 so as to investigate the fault, and the identification number of the communication channel through which to transmit the inspection request to the switch 510 are entered. In the "determination channel" field, the communication channel through which the information processing apparatus 200 transmits the data input/output request to the storage device 600 so as to investigate the fault, or the communication channel through which to transmit the inspection request to the switch 510 are entered.

Following are entered in the fault route check map 225 in FIG. 11: a communication channel (a first communication channel, TUR-1) through which a response to the data input/output request was not received from the storage device 600 within a predetermined time period; a communication channel (TUR-2) in which a first path is different from that of the first communication channel, and a second and a third paths are the same as those of the first communication channel; a communication channel (a second path, TRU-3) in which a first path is the same as that of the first communication channel, and a second and third paths are different from those of the first communication channel; and a communication channel (a third communication channel, TUR-4) in which a first and a second paths are the same as those of the first communication channel, and a third path is different from that of the first communication channel.

Following two communication channels are also entered in the fault route check map 225. One is a communication channel (TES-1), through which a first inspection request to inspect the communication ports 512 of the switch 510, which are connected to the communication ports 291 of the HBA 290 on the first communication channel in one-to-one, is transmitted from a communication port 291 which is different from the communication port 291 of the HBA 290 on the first communication channel, to the switch 510, and a response to the first inspection request is received. Another one is a communication channel (TES-2), through which a second inspection request to inspect communication ports 512 of the switch 510, which are connected to the communication ports 131 of FC I/F 130 on the first communication channel, is transmitted from a communication port 291, which is different from the communication port 291 of the HBA 290 on the first communication channel, to the switch 510, and a response to the second inspection request is received.

It should be noted that the data input/output request which the information processing apparatus 200 transmits to the storage device 600 via the communication channels denoted as TUR-2–TUR-4 may be a TUR (Test Unit Ready) command defined by, for example, SCSI (Small Computer System Interface) communication standard.

Furthermore, an inspection request (also denoted as a TEST command, hereinafter) which is transmitted to the storage device 600 by the information processing apparatus 200 via the communication channels indicated by TEST-1 to TEST-2 comprises a route specifying function, which may be a command including, for example, fields of "instruction code", "identifiers of transmitters", "identifiers of destinations" and "communication channel specifying information." Here, the "instruction code" field is a field in which the identifiers for indicating the inspection requests are entered. The "identifier of transmitter" field is a field in which the identifiers of the transmitters of the inspection request are entered. According to an example in FIG. 11, for example, "HBA106" is entered. The "identifier of destination" field is a field in which the identifiers for the destinations of the inspection request is entered. According to the example in FIG. 11, for example, "HBA106" is entered. The "communication channel designating information" field is a field in which the channel for the inspection request is entered. In the example of FIG. 11, "SW112", "SW111", and "SW112" are entered. Once such a TEST command is transmitted from HBA106, it is transmitted sequentially via SW112, SW111, SW112, and then HBA106. The information processing apparatus 200 can determine whether a fault is occurring or not in the communication port indicated by SW111 by checking that the TEST command has returned to the communication port 291 entered in the "identifier of destination" field.

Back to FIG. 19, the information processing apparatus 200 then checks if other data reading request or data writing request has been transmitted afterwards over the first communication channel (S3003). If other data reading request or data writing request has been transmitted over the first communication channel, and its response has been normally received, proceed to "Yes", and the communication channel specified by the route check number "TUR-1" of the fault route check map is determined as normal (S3004). When other data reading or data writing request has not been transmitted over the first communication channel, proceed to "No" at S3003, and it is determined whether TRU checking has terminated (S3005). If terminated, then proceed to "Yes". If the result of TUR checking has been normal (S3013), proceed to "Yes", and "normal" is entered in the fault checking result field (S3004). If the result of the TUR checking turns out to be abnormal (S3013), proceed to "No", and "abnormal" is entered into the fault checking result field (S3014). The TEST command is also processed in the same manner as the TUR command (S3006, S3013, S3004, and S3014). When checking for all route check numbers terminates, the investigation of the fault location is complete (S3015).

On the other hand, if checking for all route check numbers has not terminated at S3007, then proceed to "No", and the TUR command and TEST command are transmitted at S3008 to S3011. At this event, it is stored that fault investigation is under way at S3012.

Back to the FIG. 18, if the specified route is normal at S2006, proceed to "Yes". If the specified route is not normal, proceed to "No". That the specified route is normal refers to a case where other data reading request or data writing request is the response thereof is normal at S3003 in FIG. 19.

When that fault investigation has terminated is stored at S3015 in FIG. 19, proceed to "Yes" at S2007 in FIG. 18, and fault investigation processing is performed (S2008).

Figure 20:
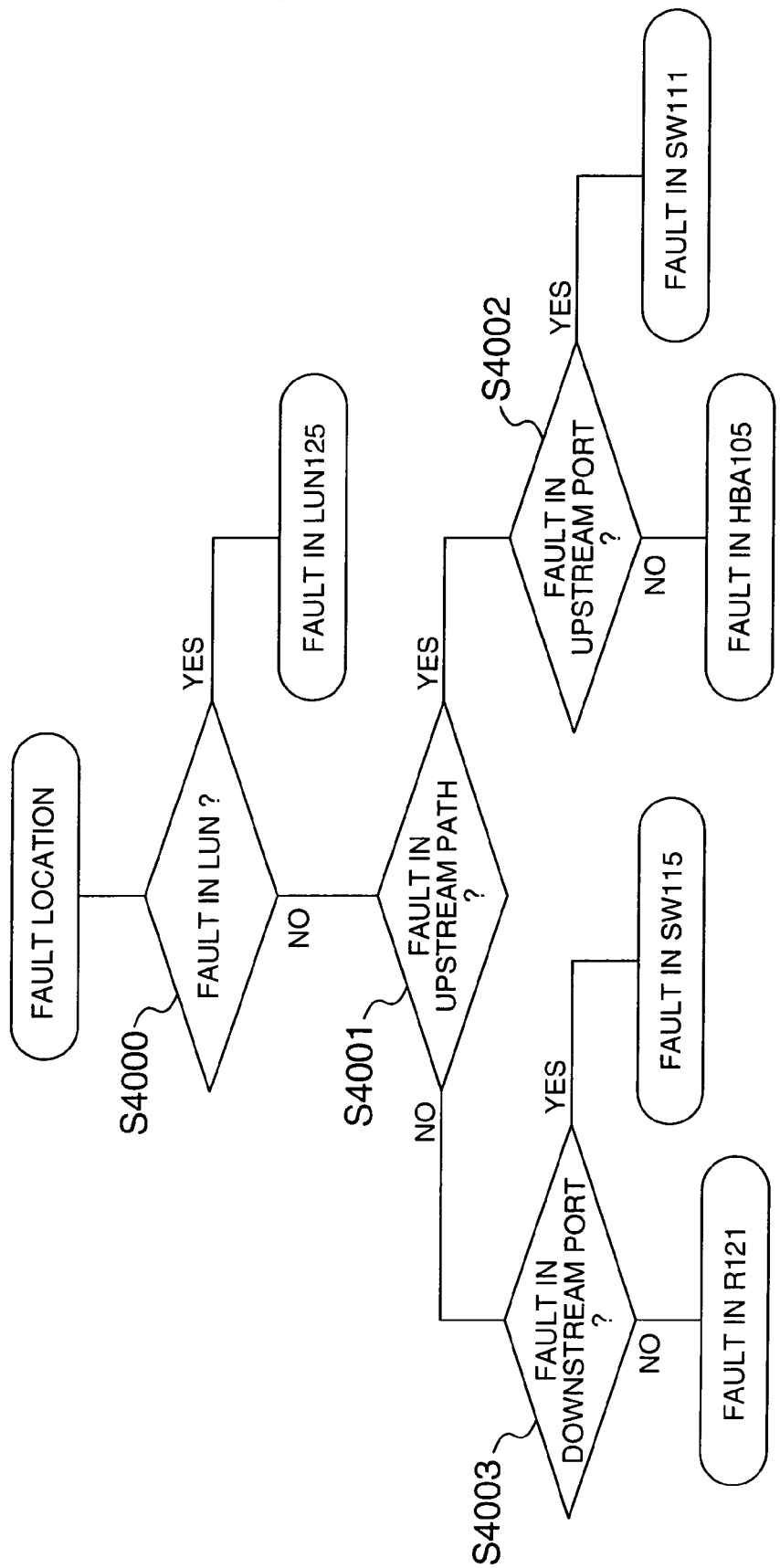
FIG. 20 is a flow chart showing the flow of investigating a fault relating to the present embodiments.
Figure 21:
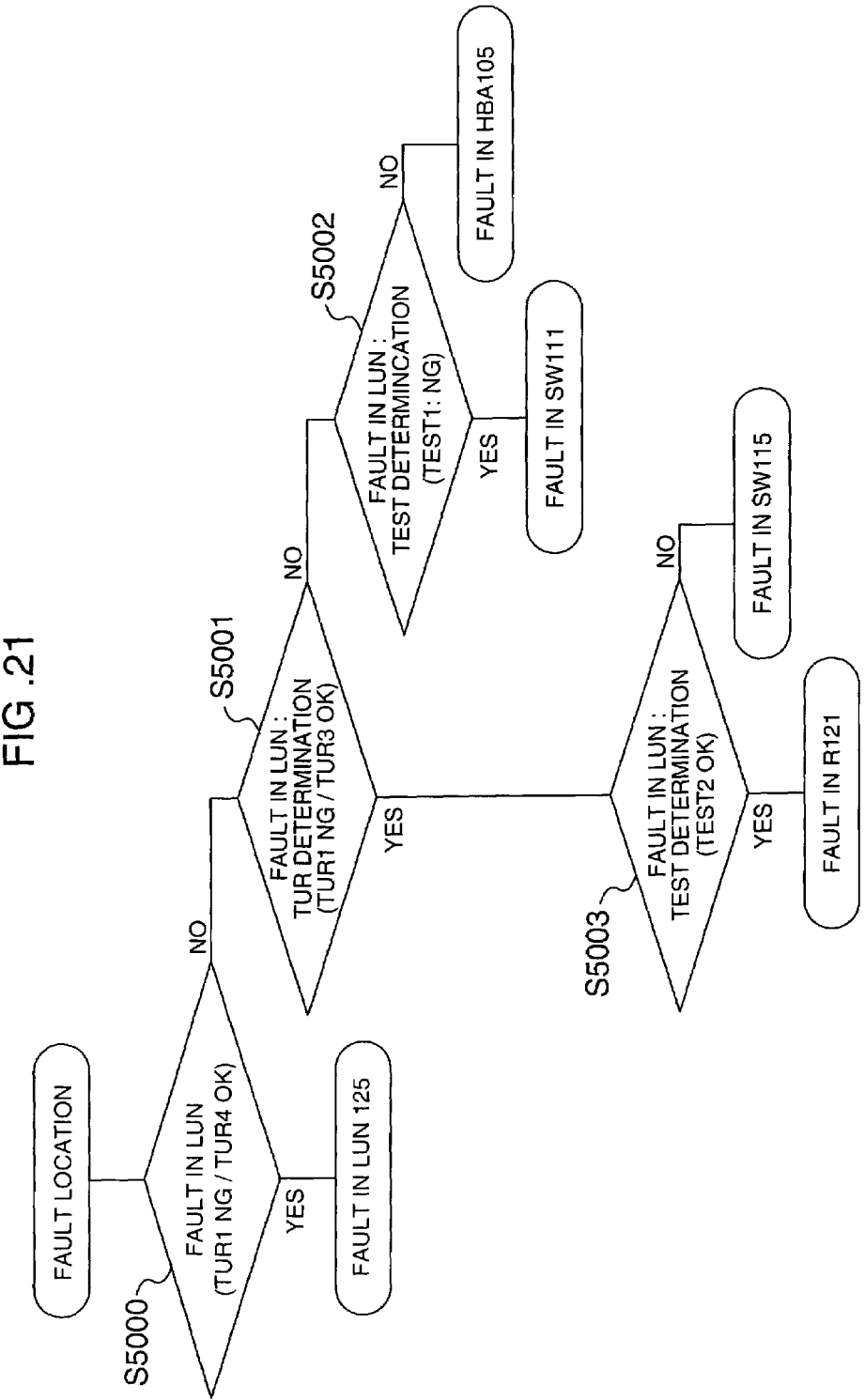
FIG. 21 is a flow chart showing the flow of investigating a fault relating to the present embodiments.

The fault location processing is illustrated in FIGS. 20 and 21. Processing indicated in FIG. 21 illustrates an example applied to an exemplum shown in FIGS. 3 to 7.

First, the information processing apparatus 200 determines if there is a fault in the storage volume 310 (S4000, S5000). In other words, when a response to the above third data input/output request which was transmitted over a third communication channel is received within a predetermined time period, it is determined that there is a fault (something unusual) in the storage volume 310. Specifically, when TUR-4 is abnormal and TUR-1 is normal as a result of fault route checking as shown in FIG. 12, the storage volume 310 is determined as abnormal (S5000).

Next, the information processing apparatus 200 determines if there is a fault in an upper stream path (S4001, S5001). Here, the upstream path refers to a first path. When a response from the storage device 600 to the above third data input/output request which was transmitted by the third communication channel is not received within a predetermined time period, and a response from the storage device 600 to the above second data input/output request which was transmitted by the second communication channel is not received within a predetermined time period either, a fault is determined to exist in the upstream path. Specifically, as FIGS. 15 and 16 show, when, as a result of fault route checking, it turns out that both TUR-1 and TUR-3 are abnormal, a fault is determined to exist in the upstream path (S5001).

When a fault is determined to exist in the upstream path, the information processing apparatus 200 determines whether there is a fault in the first communication port 291 or in the second communication port 512 (S4002, S5002). In this processing, when a response from the switch 510 to the first inspection request is received within a predetermined time period, it is determined that there is a fault in the first communication port 291, and when a response from the switch 510 to the first inspection request is not received within a predetermined time period, it is determined that there is a fault in the second communication port 512. Specifically, as FIGS. 15 and 16 show, if, as result of fault route checking, it turns out that there is not a fault in the TEST-1, it is determined that there is a fault in HBA105 (291). If it turns out that there is a fault in the TEST-1, it is determined that there is a fault in SW111 (512) (S5002).

On the other hand, if a response from the storage device 600 to the third data input/output request is not received within a predetermined time period, and a response from the storage device 600 to the second data input/output request that was transmitted over the second communication channel is not received within a predetermined time period either, it is not determined that there is a fault in the upstream path (S4001, S5001). In this event, the information processing apparatus 200 determines whether there is a fault in the second communication port 512, or in the third communication port 131 (S4003, S5003). In this processing, when a response from the switch 510 to the second inspection request is received within a predetermined time period, it is determined that there is a fault in the third communication port 131, and when a response from the switch 510 to the second inspection request is not received within a predetermined time period, it is determined that there is a fault in the second communication port 512. Specifically, as FIGS. 13 and 14 show, if, as result of fault route checking, it turns out that there is no fault in the TEST-2, it is determined that there is a fault in R121 (131), and when it turns out that there is a fault in the TEST-2, it is determined that there is a fault in SW115 (512) (S5003).

After performing fault investigation by aforementioned processing, if it turns out that there is a fault in the storage volume 310 (S2009), the information processing apparatus 200 reports to OS222 that there is a fault in the storage volume 310 (S2010). This enables the OS222 to perform processing during occurrence of a fault in the storage volume 310. Further, since it becomes impossible to write data to the storage volume 310, the OS222 reports to an application program 221 as such, as required.

Even if is there is no fault in the storage volume 310, if there is no other communication channel to the storage volume 310 (another route) available (S2011), it also becomes impossible to read data or write data from or to the storage volume 310. Therefore, the information processing apparatus 200 reports the location of fault to the OS222. This enables the OS222 to perform processing during occurrence of a fault. The OS222 also reports as such, as required, to the application program 221.

Figure 31:
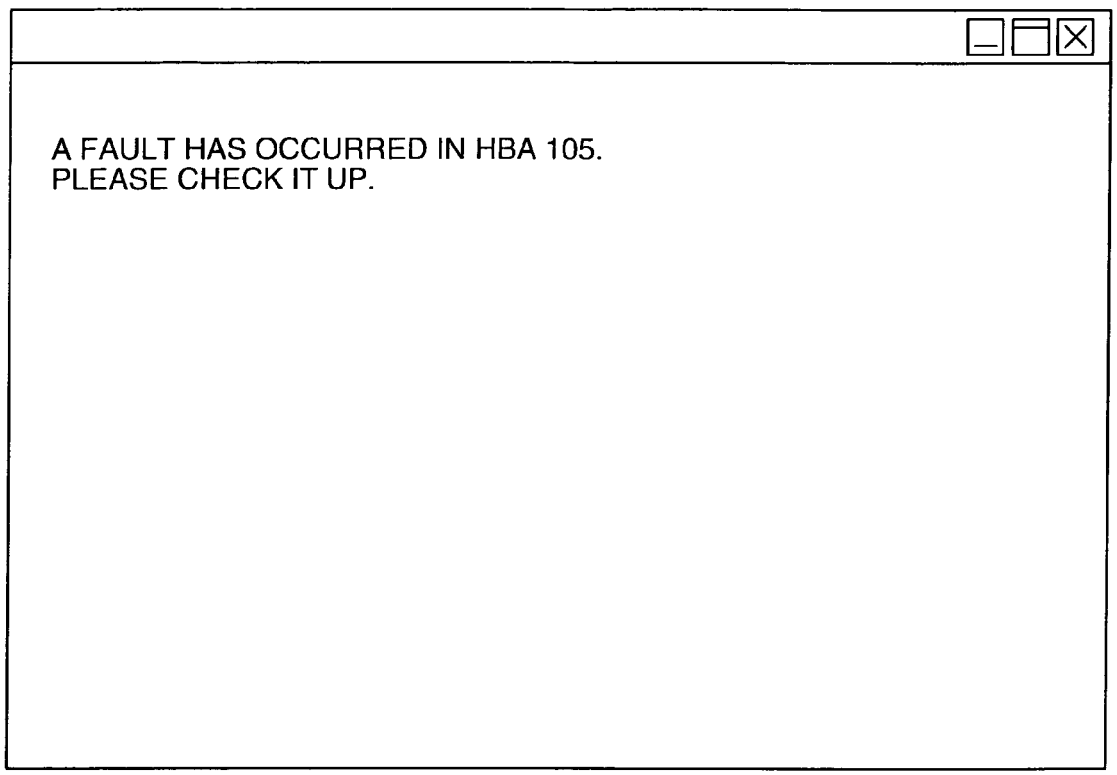
FIG. 31 shows a state in which the location of a fault is displayed on an interface relating to the present embodiments.

If there is another route available at S2011, the information processing apparatus 200 transmits the data input/output request to the storage 600 over another route (S2013), and displays where there is a fault (determination result) on the interface. FIG. 31 shows an example in which the location of a fault is displayed on a display comprised by the information processing apparatus 200. This enables the operator to immediately recognize where there is a fault in the information processing system.

It should be noted that it is also possible to make the storage device 600 inspect whether there is a fault in the communication port 131 of the storage device 600, which is illustrated in FIGS. 24 to 28.

First, the information processing apparatus 200 issues a RAID fault investigating instruction to the storage device 600 (S7000). The RAID fault locating instruction is an instruction to make the storage device 600 check the communication port 131. Upon receipt of the instruction, the storage device 600 creates a storage device port check table 123 shown in FIG. 27 based on the storage device configuration information management table 122 shown if FIG. 8. The storage device port check table 123 is a list of all routes that go from each communication port 131 of the storage device 600 to the communication port 512 of the switch 510, and then return to each communication port 131 of the storage device 600. The storage device 600 transmits a TEST command according to the storage device port check table 123, and enters the result into the result field of the storage device port check table 123. Then, the storage device 600 transmits the storage device port check table 123 to the information processing apparatus 200. Then, the information processing apparatus 200 enters whether there is a fault or not in each communication port 131 into the RAID fault investigation result field of the storage device configuration information management table 122 based on the check result which is entered into the storage device port check table 123 (S7001).

The information processing apparatus 200 repeatedly transmits, for example, RAID fault investigating instructions to the storage device 600, and keeps track of whether there is a fault in the communication port 131 of the storage device 600 from the RAID fault investigating result field in the storage device configuration information management table 122. Thus, the information processing apparatus 200 can investigate more quickly the fault that occurs in the communication channel between the information processing apparatus 200 and storage device 600. It is because, for example, wasteful transmission of TEST command and TUR command can be eliminated based on the information on whether there is a fault in the communication port 131 that is entered into the RAID fault investigating result field of the storage device configuration information management table 122.

Figure 30:
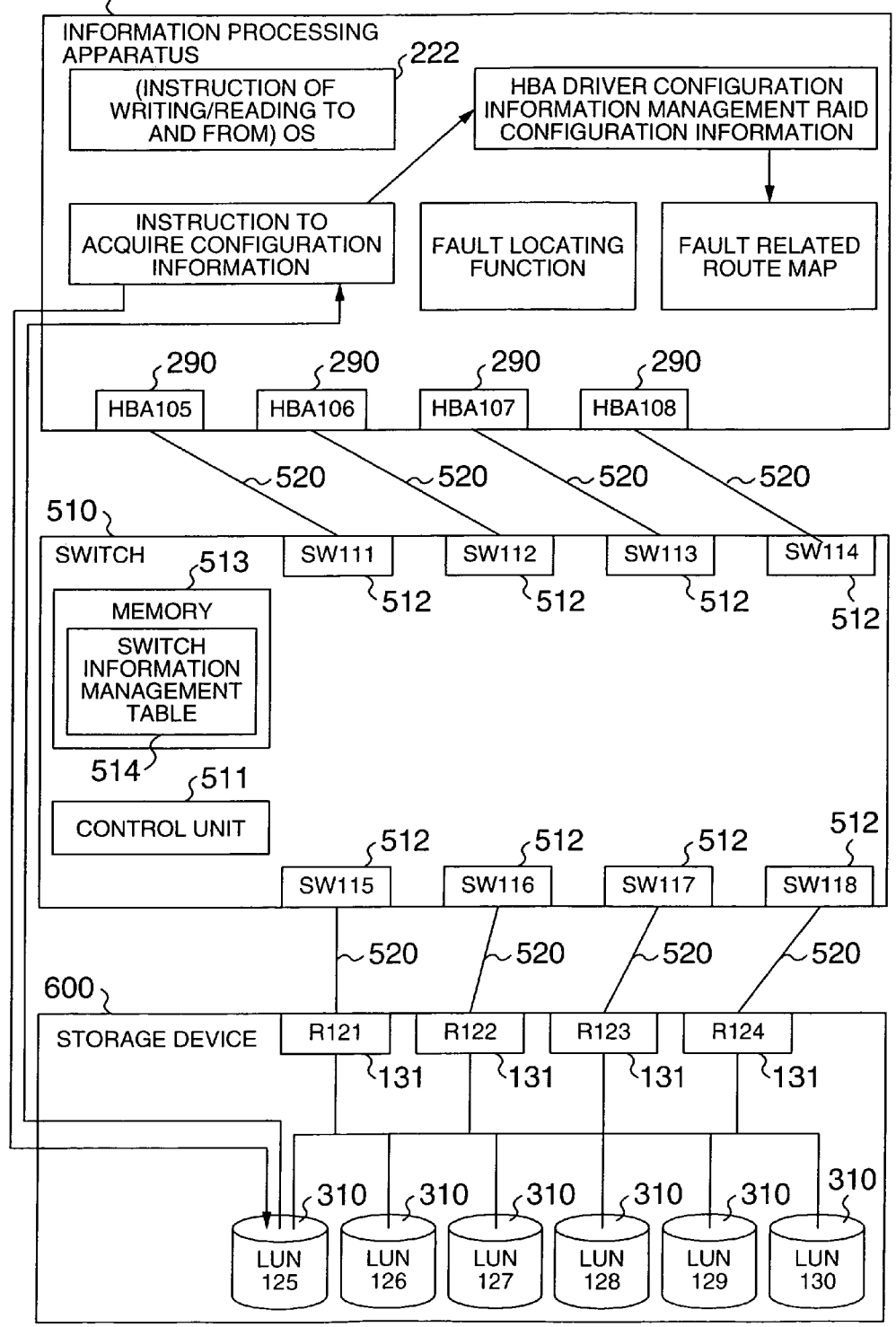
FIG. 30 shows a state in which an instruction for monitoring recovery from fault is transmitted by the information processing apparatus relating to the present embodiments.

The information processing apparatus 200 relating to the present embodiments may also be designed to transmit an instruction to monitor recovery from a fault to the storage device 600 via a recovered communication channel, after recovery from the fault that occurred on the communication channel, as illustrated in FIG. 30. In this event, the information processing apparatus 200 may also be designed to transmit the instruction to monitor recovery from a fault repeatedly for some times.

In this way, it becomes possible to monitor the subsequent occurrence of a fault in a communication channel in which there once occurred a fault. Further, when a fault may occur in the communication channel afterwards, the transmission of the instruction to monitor recovery from a fault allows reporting to the operator as such by displaying the occurrence of the fault on the user's interface. Thus, the operator may take countermeasures with emphasis on checking the communication channel, or the like.

Figure 34:
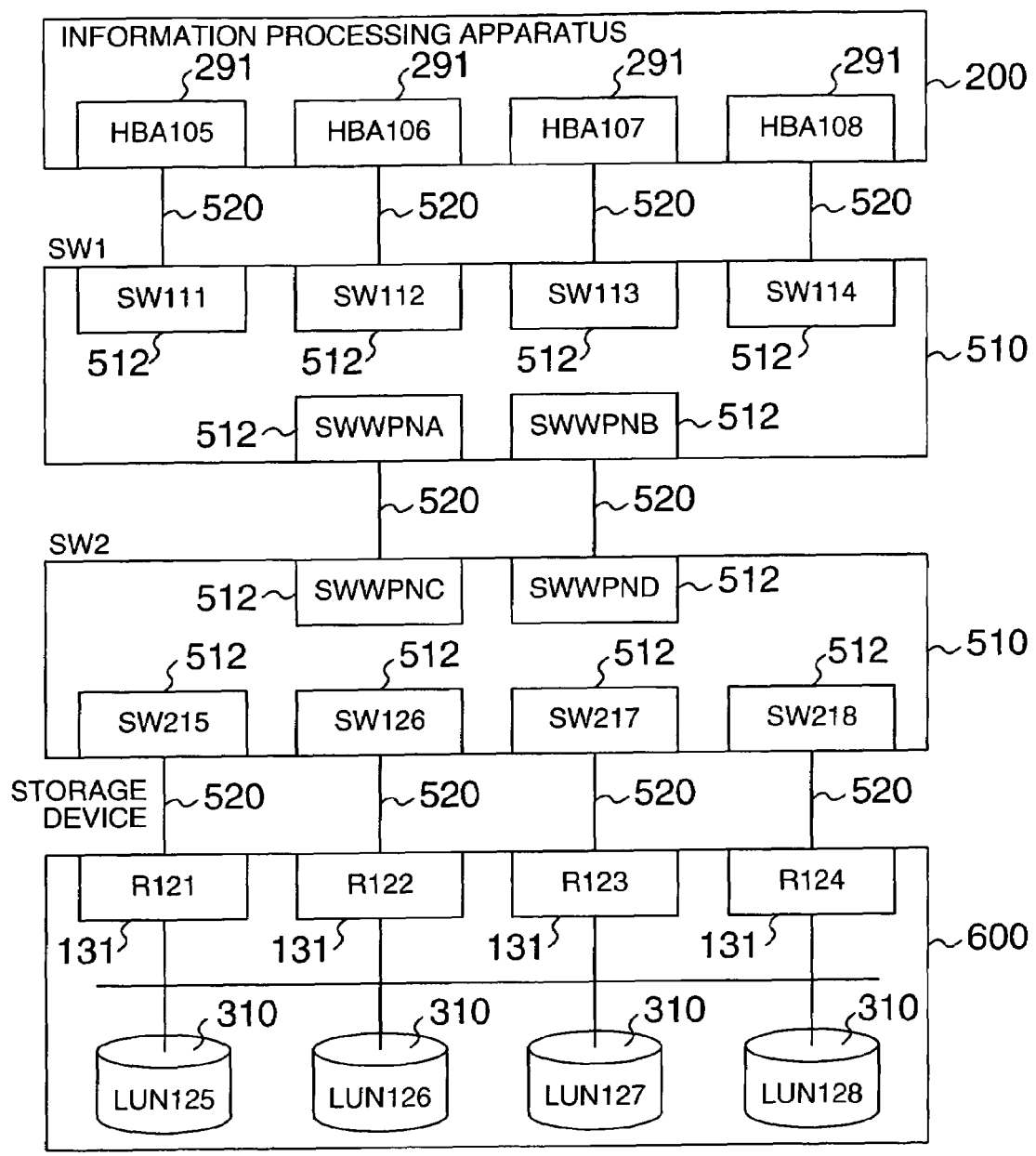
FIG. 34 is a block diagram showing an entire configuration of the information processing system relating to the present embodiment.

The information processing system relating to the present embodiments may also be configured as illustrated in FIG. 34. In other words, it may be configured to comprise switches in multistage between the information processing apparatus 200 and the storage device 600 (in a cascade configuration). An HBA basic configuration information table 226 in this event is shown in FIG. 35. Also in this event, the information processing apparatus 200 creates the HBA driver configuration information management table 224 based on the information entered into the switch information management table 514 and storage device configuration information management table 122, and the HBA basic configuration information table 226. The created HBA driver configuration information management table 224 is shown in FIG. 36. Then, the information processing apparatus 200 creates the fault route check map 225 based on the HBA driver configuration information management table 224. The fault route check map 225 is shown in FIG. 37. The information processing apparatus 200 can investigate the fault in the communication channel by transmitting the TUR command and TEST command according to the fault route check map 225.

Figure 32:
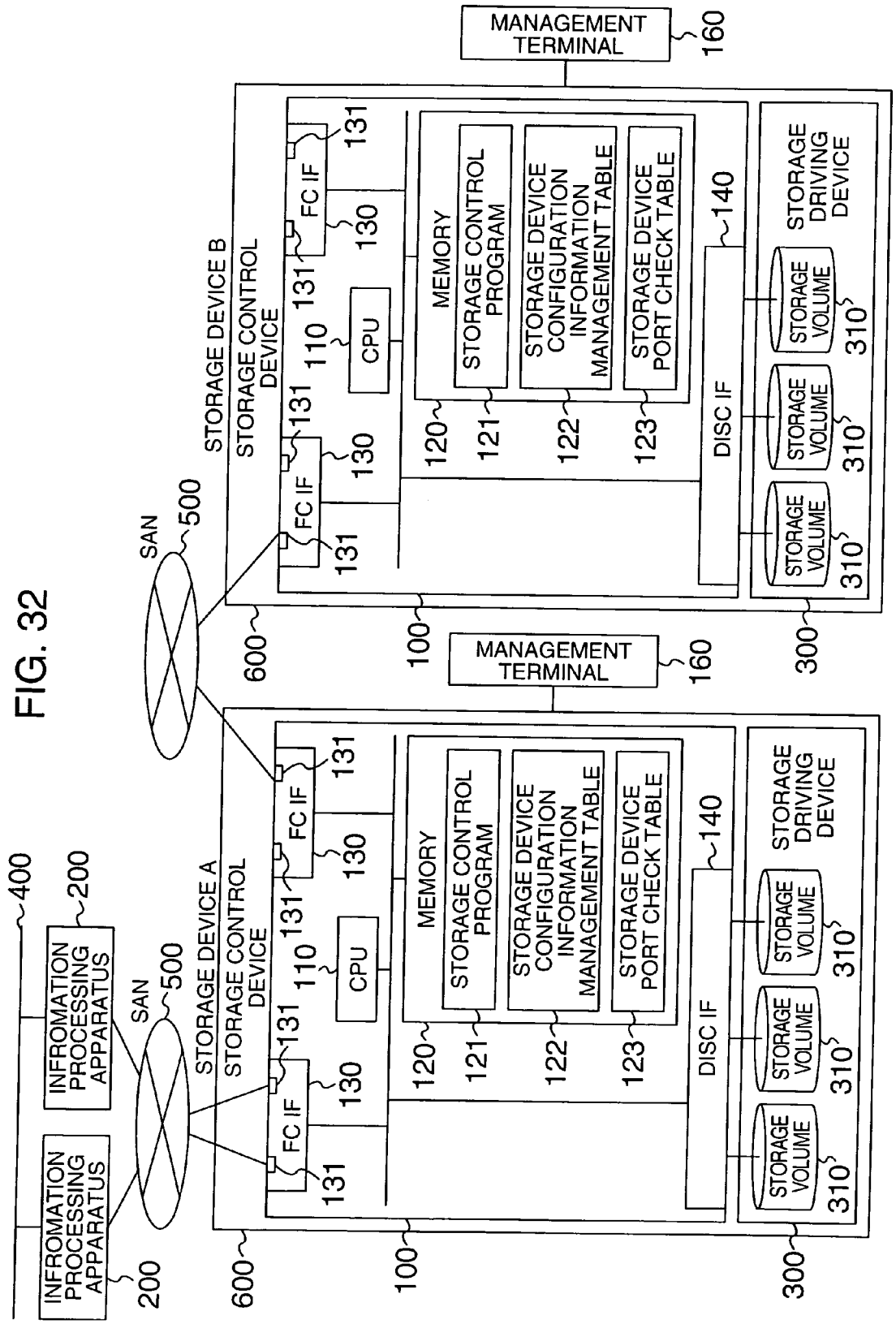
FIG. 32 is a block diagram showing an entire configuration of an information processing system relating to the present embodiments.

Furthermore, the information processing system relating to the present embodiments may also be configured as shown in FIG. 32. In other words, a storage device A600 and a storage device B600 are configured to be connected via the SAN500. In this event, the storage device configuration information management table 122 and storage device port check table 123 stored in the storage device B600 are transmitted to the information processing apparatus 200 via the storage device A600. Even with the configuration as shown in FIG. 32, in which the storage device A600 is interposed to allow communication between the information processing apparatus 200 and the storage device B600, it is possible to investigate a fault in a communication channel between the information processing apparatus 200 and storage device 600.

The information processing apparatus 200 relating to the present embodiments has been described, and according to the information processing apparatus 200 relating to the present embodiments, it becomes possible to facilitate the investigation of a fault on the communication channel between the information processing apparatus 200 and storage device 600, and to shorten the time taken to investigate the fault. This enables reducing maintenance work load of the information processing system. Furthermore, it becomes possible to reduce the time taken to recover from a failure in the information processing apparatus, thus making it possible to improve the availability of the information processing system.

While the most preferred embodiments to implement the present invention have been described in the above, it will be recognized that the above description for the embodiments is intended to facilitate understanding of the present invention, not intended for limitation. The present invention may be modified and improved without departing from the spirit of the invention, and includes equivalents thereof.

What is claimed is:

1. An information processing apparatus in an information processing system that comprises an information processing apparatus having a plurality of first communication ports, a switch having a plurality of second communication ports, and a storage device having a plurality of third communication ports and a plurality of storage volumes, wherein said first communication ports and said third communication ports are connected to said second communication ports in one-to-one so that they can communicate with each other, said information processing apparatus comprising:

a first data input/output request transmitting unit which transmits a first data input/output request over a first communication channel, that extends from one of said first communication ports to a first storage volume of the plurality of storage volumes and is specified by a first path which is specified by an identifier of said first communication port and an identifier of one of said second communication ports connected to said first communication port, a second path which is specified by an identifier of one of said third communication ports and an identifier of another one of said second communication ports connected to said third communication port, and a third path which is specified by the identifier of said third communication port and an identifier of said first storage volume;

a second data input/output request transmitting unit which transmits a second data input/output request over a second communication channel extending to said first storage volume, in which said first path is the same as that of said first communication channel, and said second and third paths are different from those of said first communication channel, and transmitting a third data input/output request over a third communication channel extending to a second storage volume of the plurality of storage volumes in which said first and second paths are the same as those of said first communication channel, and a third path is different from that of said first communication channel, when a response from said storage device to said first data input/output request is not received within a predetermined time period;

an inspection request transmitting unit which transmits from another one of said first communication ports, which is different from said first communication port on said first communication channel, to said switch a first inspection request to inspect said second communication port connected to said first communication port on said first communication channel, and a second inspection request to inspect said second communication port connected to said third communication port on said first communication channel; and a fault investigating unit which determines that there is a fault in said first communication port on said first communication channel when a response from said storage device to said third data input/output request which was transmitted over said third communication channel is not received within a predetermined time period, a response from said storage device to said second data input/output request which was transmitted over said second communication channel is not received within a predetermined time period, and a response from said switch to said first inspection request is received within a predetermined time period.

2. The information processing apparatus according to claim 1, wherein said fault investigating unit determines that there is a fault in said second communication port connected to said first communication port on said first communication channel, when a response from said storage device to said third data input/output request which was transmitted over said third communication channel is not received within a predetermined time period, a response from said storage device to said second data input/output request which was transmitted over said second communication channel is not received within a predetermined time period, and a response from said switch to said first inspection request is not received within a predetermined time period.

3. The information processing apparatus according to claim 1, wherein said fault investigating unit determines that there is a fault in said second communication port connected to said third communication port on said first communication channel, when a response from said storage device to said third data input/output request which was transmitted over said third communication channel is not received within a predetermined time period, a response from said storage device to said second data input/output request which was transmitted over said second communication channel is received within a predetermined time period, and a response from said switch to said second inspection request is not received within a predetermined time period.

4. The information processing apparatus according to claim 1, wherein said fault investigating unit determines that there is a fault in said third communication port on said first communication channel, when a response from said storage device to said third data input/output request which was transmitted over said third communication channel is not received within a predetermined time period, a response from said storage device to said second data input/output request which was transmitted over said second communication channel is received within a predetermined time period, and a response from said switch to said second inspection request is received within a predetermined time period.

5. The information processing apparatus according to claim 1, wherein said fault investigating unit determines that there is a fault in said first storage volume, when a response from said storage device to said third data input/output request which was transmitted over said third communication channel is received within a predetermined time period.

6. The information processing apparatus according to claim 1, wherein said first data input/output request is a data reading request or a data writing request to said first storage volume, and said second data input/output request and said third data input/output request are a TUR command defined by SCSI.

7. The information processing apparatus according to claim 1, further comprising a host bus adapter, wherein
said first communication port is a communication port comprised by said host bus adapter.

8. The information processing apparatus according to claim 1, further comprising a determination result displaying unit which displays the result of determination by said fault investigating unit on a user interface.

9. A control method for the information processing apparatus in an information processing system that comprises an information processing apparatus having a plurality of first communication ports, a switch having a plurality of second communication ports, and a storage device having a plurality of third communication ports and a plurality of storage volumes, said first communication ports and said third communication ports being connected to said second communication ports in one-to-one so that they can communicate with each other, said method comprising:

transmitting a first data input/output request over a first communication channel, which extends from one of said first communication ports to a first storage volume of the plurality of storage volumes and is specified by a first path which is specified by an identifier of said first communication port and an identifier of one of said second communication ports connected to said first communication port, a second path which is specified by an identifier of one of said third communication ports and an identifier of another one of said second communication ports connected to said third communication port, and a third path which is specified by the identifier of said third communication port and an identifier of said first storage volume;

when a response from said storage device to said first data input/output request is not received within a predetermined time period, transmitting a second data input/output request over a second communication channel extending to said first storage volume in which said first path is the same as that of said first communication channel, and said second and third paths are different from those of said first communication channel, and transmitting a third data input/output request over a third communication channel extending to a second storage volume of the plurality of storage volumes in which said first and second paths are the same as those of said first communication channel, and said third path is different from that of said first communication channel;

transmitting from another one of said first communication ports which is different from said first communication port on said first communication channel, to said switch a first inspection request to inspect said second communication port connected to said first communication port on said first communication channel, and a second inspection request to inspect said second communication port connected to said third communication port on said first communication channel; and when a response from said storage device to said third data input/output request which was transmitted over said third communication channel is not received within a predetermined time period, a response from said storage device to said second data input/output request which was transmitted over said second communication channel is not received within a predetermined time period, and a response from said switch to said first inspection request is received within a predetermined time period, determining that there is a fault in said first communication port on said first communication channel.

10. The control method for the information processing apparatus according to claim 9, said method determining that there is a fault in said second communication port connected to said first communication port on said first communication channel, when a response from said storage device to said third data input/output request which was transmitted over said third communication channel is not received within a predetermined time period, a response from said storage device to said second data input/output request which was transmitted over said second communication channel is not received within a predetermined time period, and a response from said switch to said first inspection request is not received within a predetermined time period.

11. The control method for the information processing apparatus according to claim 9, said method determining that there is a fault in said second communication port connected to said third communication port on said first communication channel, when a response from said storage device to said third data input/output request which was transmitted over said third communication channel is not received within a predetermined time period, a response from said storage device to said second data input/output request which was transmitted over said second communication channel is received within a predetermined time period, and a response from said switch to said second inspection request is not received within a predetermined time period.

12. The control method for the information processing apparatus according to claim 9, said method determining that there is a fault in said third communication port on said first communication channel when a response from said storage device to said third data input/output request which was transmitted over said third communication channel is not received within a predetermined time period, a response from said storage device to said second data input/output request which was transmitted over said second communication channel is received within a predetermined time period, and a response from said switch to said second inspection request is received within a predetermined time period.

13. The control method for the information processing apparatus according to claim 9, said method determining that there is a fault in said first storage volume, when a response from said storage device to said third data input/output request which was transmitted over said third communication channel is received within a predetermined time period.

14. The control method for the information processing apparatus according to claim 9, wherein said first data input/output request is a request to read data or to write data from or to said first storage volume, and said second data input/output request and said third data input/output request are TUR commands defined by SCSI standard.

15. The control method for the information processing apparatus according to claim 9, further comprising a host bus adapter, wherein said first communication port is a communication port comprised by said host bus adapter.

16. The control method for the information processing apparatus according to claim 9, further displaying said result of determination on the user's interface.

17. An information processing apparatus in an information processing system that comprises an information processing apparatus having a plurality of first communication ports, a switch having a plurality of second communication ports, and a storage device having a plurality of third communication ports and a plurality of storage volumes, said first communication ports and said third communication ports being connected to said second communication ports in one-to-one so that they can communicate with each other, said information processing apparatus comprising:

a first data input/output request transmitting unit which transmits a first data input/output request over a first communication channel, which extends from one of said first communication ports to a first storage volume of the plurality of storage volumes and is specified by a first path which is specified by an identifier of said first communication port and an identifier of one of said second communication ports connected to said first communication port, a second path which is specified by an identifier of one of said third communication ports and an identifier of another one of said second communication ports connected to said third communication port, and a third path which is specified by the identifier of said third communication port and an identifier of said first storage volume;

a second data input/output request transmitting unit which transmits a second data input/output request over a second channel extending to said first storage volume in which said first path is the same as that of said first communication channel, and said second and third paths are different from those of said first communication channel, and transmitting a third data input/output request over a third communication channel extending to a second storage volume of the plurality of storage volumes in which said first and second paths are the same as those of said first communication channel, and third path is different from that of said first communication channel, when a response from said storage device to said first data input/output request is not received within a predetermined time period; and an inspection requests transmitting unit which transmits from another one of said first communication ports, which is different from said first communication port on said first communication channel, to said switch a first inspection request to inspect said second communication port connected to said first communication port on said communication channel, and transmitting a second inspection request to inspect said second communication port connected to said third communication port on said first communication channel; wherein said information processing apparatus determining there is a fault in said first communication port on said first communication channel, when a response from said storage device to said third data input/output request which was transmitted over said third communication channel is not received within a predetermined time period, a response from said storage device to said second data input/output request which was transmitted over said second communication channel is not received within a predetermined time period, and a response from said switch to said first inspection request is received within a predetermined time period;

determining there is a fault in said second communication port on said first communication channel, when a response from said storage device to said third data input/output request which was transmitted over said third communication channel is not received within a predetermined time period, a response from said storage device to said second data input/output request which was transmitted over said second communication channel is not received within a predetermined time period, and a response from said switch to said first inspection request is not received within a predetermined time period;

determining there is a fault in said first communication port on said first communication channel, when a response from said storage device to said third data input/output request which was transmitted over said third communication channel is not received within a predetermined time period, a response from said storage device to said second data input/output request which was transmitted over said second communication channel is received within a predetermined time period, and a response from said switch to said first inspection request is not received within a predetermined time period; and determining there is a fault in said third communication port on said first communication channel, when a response from said storage device to said third data input/output request which was transmitted over said third communication channel is not received within a predetermined time period, a response from said storage device to said second data input/output request which was transmitted over said second communication channel is received within a predetermined time period, and a response from said switch to said first inspection request is received within a predetermined time period; and said information processing apparatus further comprising:

a fault investigating unit which determines that there is a fault in said first storage volume when a response from said storage device to said third data input/output request which was transmitted over said third communication channel is received within a predetermined time period; and determination displaying unit which displays the result of determination by said fault investigating unit.

* * * * *